(12) United States Patent
Fichman et al.

(10) Patent No.: US 12,213,449 B2
(45) Date of Patent: Feb. 4, 2025

(54) ANIMAL MARKING CONTROL SYSTEM AND METHOD

(71) Applicant: S.C.R. (ENGINEERS) LIMITED, Netanya (IL)

(72) Inventors: Alon Fichman, Netanya (IL); Mordehay Cohen, Netanya (IL)

(73) Assignee: S.C.R. (ENGINEERS) LIMITED, Netanya (IL)

( * ) Notice: Subject to any disclaimer, the term of this patent is extended or adjusted under 35 U.S.C. 154(b) by 0 days.

(21) Appl. No.: 18/261,265

(22) PCT Filed: Jan. 20, 2022

(86) PCT No.: PCT/IL2022/050084
§ 371 (c)(1),
(2) Date: Jul. 13, 2023

(87) PCT Pub. No.: WO2022/157770
PCT Pub. Date: Jul. 28, 2022

(65) Prior Publication Data
US 2024/0090473 A1    Mar. 21, 2024

(30) Foreign Application Priority Data
Jan. 24, 2021 (IL) .......................................... 280374

(51) Int. Cl.
*A01K 11/00* (2006.01)
*A01K 29/00* (2006.01)

(52) U.S. Cl.
CPC .......... *A01K 11/006* (2013.01); *A01K 29/005* (2013.01)

(58) Field of Classification Search
CPC .... A01K 11/006; A01K 11/00; A01K 29/005; G08B 21/18; G06K 7/0008
See application file for complete search history.

(56) References Cited

U.S. PATENT DOCUMENTS

| 1,016,752 A | 2/1912 | Leith |
| 1,188,510 A | 6/1916 | Timson |

(Continued)

FOREIGN PATENT DOCUMENTS

| AU | 199534570 | 10/1994 |
| AU | 2003239832 | 5/2002 |

(Continued)

OTHER PUBLICATIONS

Christian Pahl, Eberhard Hartung, Anne Grothmann, Katrin Mahlkow-Nerge, Angelika Haeussermann, Rumination activity of dairy cows in the 24 hours before and after calving, Journal of Dairy Science, vol. 97, Issue 11, 2014, pp. 6935-6941.

(Continued)

*Primary Examiner* — Hoi C Lau
(74) *Attorney, Agent, or Firm* — S.J. Intellectual Property LTD.

(57) ABSTRACT

An animal marking control system includes: at least one transceiver communicatively coupled to a remote base station (BS) and configured to exchange data with the BS, the transceiver having a plurality of operation modes (OMs), each of the OMs defining a respective frequency of communication (FoC) of the transceiver with the BS; a marker unit configured to selectively mark the animal; a processing circuitry configured to: cause activation of the transceiver at a first OM of the OMs, wherein in the first OM the transceiver communicates with the BS in a first FoC; receive an indication of a marking need from the BS; upon receipt of the indication of a marking need, cause activation of the transceiver at a second OM of the OMs, wherein in the second OM the transceiver communicates with the BS in a second FoC; receive marker unit activation instructions; activate the marker unit.

20 Claims, 3 Drawing Sheets

(56) References Cited

U.S. PATENT DOCUMENTS

| | | |
|---|---|---|
| 1,364,137 A | 1/1921 | Pannier |
| 1,759,400 A | 5/1930 | Hobbs |
| 1,843,314 A | 2/1932 | Berntson et al. |
| 1,863,037 A | 6/1932 | Archbold |
| 2,078,827 A | 4/1937 | Ward |
| 2,420,020 A | 5/1947 | Snell |
| 2,553,400 A | 5/1951 | Blair |
| 2,570,048 A | 10/1951 | Cooke et al. |
| 3,091,770 A | 6/1963 | McMurray et al. |
| 3,261,243 A | 7/1966 | Ellison |
| 3,596,541 A | 8/1971 | Bieganski |
| 3,812,859 A | 5/1974 | Murphy et al. |
| 3,884,100 A | 5/1975 | Fideldy |
| 3,981,209 A | 9/1976 | Caroff |
| 4,120,303 A | 10/1978 | Villa-Massone et al. |
| 4,121,591 A | 10/1978 | Hayes |
| 4,281,657 A | 8/1981 | Ritchey |
| 4,323,183 A | 4/1982 | Duchin |
| 4,497,321 A | 2/1985 | Fearing et al. |
| 4,516,577 A | 5/1985 | Scott et al. |
| 4,531,520 A | 7/1985 | Reggers et al. |
| 4,552,147 A | 11/1985 | Gardner |
| 4,666,436 A | 5/1987 | McDonald et al. |
| 4,672,966 A | 6/1987 | Haas, Jr. |
| 4,696,119 A | 9/1987 | Howe et al. |
| 4,716,899 A | 1/1988 | Huenefeld et al. |
| 4,819,639 A | 4/1989 | Gardner |
| 4,821,683 A | 4/1989 | Veldman |
| 4,878,302 A | 11/1989 | Jowsey |
| 4,943,294 A | 7/1990 | Knapp |
| 5,022,253 A | 6/1991 | Parlatore |
| 5,056,385 A | 10/1991 | Petersen |
| 5,141,514 A | 8/1992 | van Amelsfort |
| 5,154,721 A | 10/1992 | Perez |
| 5,267,464 A | 12/1993 | Cleland |
| 5,509,291 A | 4/1996 | Nilsson et al. |
| 5,651,791 A | 7/1997 | Zavlodaver et al. |
| 5,778,820 A | 7/1998 | van der Lely et al. |
| 6,007,548 A | 12/1999 | Ritchey |
| 6,016,769 A | 1/2000 | Forster |
| 6,043,748 A | 3/2000 | Touchton et al. |
| 6,053,926 A | 4/2000 | Luehrs |
| 6,095,915 A | 8/2000 | Battista et al. |
| 6,099,482 A | 8/2000 | Brune et al. |
| 6,100,804 A | 8/2000 | Brady et al. |
| 6,113,539 A | 9/2000 | Ridenour |
| 6,114,957 A | 9/2000 | Westrick et al. |
| 6,145,225 A | 11/2000 | Ritchey |
| 6,166,643 A | 12/2000 | Janning et al. |
| 6,172,640 B1 | 1/2001 | Durst et al. |
| 6,232,880 B1 | 5/2001 | Anderson et al. |
| 6,235,036 B1 | 5/2001 | Gardner et al. |
| 6,271,757 B1 | 8/2001 | Touchton et al. |
| 6,297,739 B1 | 10/2001 | Small |
| 6,310,553 B1 | 10/2001 | Dance |
| 6,402,692 B1 | 6/2002 | Morford |
| 6,497,197 B1 | 12/2002 | Huisma |
| 6,502,060 B1 | 12/2002 | Christian |
| 6,510,630 B1 | 1/2003 | Gardner |
| 6,535,131 B1 | 3/2003 | Bar-Shalom et al. |
| 6,569,092 B1 | 5/2003 | Booker |
| 6,659,039 B1 | 12/2003 | Larsen |
| 6,868,804 B1 | 3/2005 | Huisma et al. |
| 6,997,140 B2 | 2/2006 | Finlayson |
| 7,016,730 B2 | 3/2006 | Ternes |
| 7,046,152 B1 | 5/2006 | Peinetti et al. |
| 7,137,359 B1 | 11/2006 | Braden |
| 7,296,539 B2 | 11/2007 | Iljas |
| 7,380,518 B2 | 6/2008 | Kates |
| 7,705,736 B1 | 4/2010 | Kedziora |
| 7,764,181 B2 * | 7/2010 | Stewart ............ G06K 7/10178 |
| | | 340/572.1 |
| 7,772,979 B2 | 8/2010 | Nehls |
| 7,843,350 B2 | 11/2010 | Geissler et al. |
| 7,937,861 B1 | 5/2011 | Zacher |
| 8,005,624 B1 | 8/2011 | Starr |
| 8,266,990 B1 | 9/2012 | Janson |
| 8,305,220 B2 | 11/2012 | Gibson |
| 8,478,389 B1 | 7/2013 | Brockway et al. |
| 8,493,185 B2 * | 7/2013 | Bateman ............ G06K 7/10198 |
| | | 340/10.2 |
| 8,622,929 B2 | 1/2014 | Wilson et al. |
| 8,763,557 B2 | 7/2014 | Lipscomb et al. |
| 8,955,462 B1 | 2/2015 | Golden et al. |
| 9,215,862 B2 | 12/2015 | Bladen et al. |
| 9,392,767 B2 | 7/2016 | Johnson, III et al. |
| 9,392,946 B1 | 7/2016 | Sarantos et al. |
| 9,430,732 B2 * | 8/2016 | Mats ............... G06K 19/07766 |
| 9,449,487 B1 | 9/2016 | Spitalny |
| 9,648,849 B1 | 5/2017 | Vivathana |
| 9,654,925 B1 | 5/2017 | Solinsky et al. |
| 9,693,536 B1 | 7/2017 | Dana |
| 9,717,216 B1 | 8/2017 | Schlachta et al. |
| 9,743,643 B1 | 8/2017 | Kaplan et al. |
| 9,848,577 B1 | 12/2017 | Brandao et al. |
| 9,861,080 B1 | 1/2018 | Hathway et al. |
| 10,004,204 B2 | 6/2018 | Hayes et al. |
| 10,021,857 B2 | 7/2018 | Bailey et al. |
| 10,039,263 B2 | 8/2018 | Teychene et al. |
| 10,045,511 B1 | 8/2018 | Yarden et al. |
| 10,064,391 B1 | 9/2018 | Riley |
| 10,091,972 B1 | 10/2018 | Jensen et al. |
| 10,154,649 B2 * | 12/2018 | Hill ..................... A01K 15/021 |
| 10,231,442 B1 | 3/2019 | Chang et al. |
| 10,242,547 B1 | 3/2019 | Struhsaker et al. |
| 10,264,762 B1 | 4/2019 | Lamb |
| 10,342,219 B2 * | 7/2019 | Deliou ............ G06K 19/07749 |
| 10,352,759 B1 | 7/2019 | Jensen |
| 10,420,634 B2 * | 9/2019 | Folkers ................ A01K 11/006 |
| 10,446,006 B1 | 10/2019 | Johnson, Jr. et al. |
| 10,512,430 B1 | 12/2019 | Hladio |
| 10,588,295 B1 | 3/2020 | Riley |
| 10,628,725 B1 * | 4/2020 | Mei ................. G06K 19/07309 |
| 10,628,756 B1 | 4/2020 | Kuper et al. |
| 10,638,726 B1 | 5/2020 | Makarychev et al. |
| 10,691,674 B2 | 6/2020 | Leong et al. |
| 11,026,402 B2 * | 6/2021 | Deliou ................. H04W 4/021 |
| 11,651,169 B2 * | 5/2023 | Mei ................... G06K 19/0716 |
| | | 340/572.5 |
| 2001/0027751 A1 | 10/2001 | van den Berg |
| 2002/0010390 A1 | 1/2002 | Guice |
| 2002/0021219 A1 | 2/2002 | Edwards |
| 2002/0091326 A1 | 7/2002 | Hashimoto et al. |
| 2002/0095828 A1 | 7/2002 | Koopman et al. |
| 2002/0154015 A1 | 10/2002 | Hixson |
| 2002/0158765 A1 | 10/2002 | Pape et al. |
| 2003/0004652 A1 | 1/2003 | Brunner et al. |
| 2003/0023517 A1 | 1/2003 | Marsh et al. |
| 2003/0028327 A1 | 2/2003 | Brunner et al. |
| 2003/0062001 A1 | 4/2003 | Andersson |
| 2003/0066491 A1 | 4/2003 | Stampe |
| 2003/0144926 A1 | 7/2003 | Bodin et al. |
| 2003/0146284 A1 | 8/2003 | Schmit et al. |
| 2003/0149526 A1 | 8/2003 | Zhou et al. |
| 2003/0177025 A1 | 9/2003 | Curkendall et al. |
| 2003/0201931 A1 | 10/2003 | Durst et al. |
| 2003/0208157 A1 | 11/2003 | Eidson et al. |
| 2003/0221343 A1 | 12/2003 | Volk et al. |
| 2003/0229452 A1 | 12/2003 | Lewis |
| 2004/0066298 A1 | 4/2004 | Schmitt et al. |
| 2004/0078390 A1 | 4/2004 | Saunders |
| 2004/0118920 A1 | 6/2004 | He |
| 2004/0123810 A1 | 7/2004 | Lorton et al. |
| 2004/0177011 A1 | 9/2004 | Ramsay et al. |
| 2004/0201454 A1 | 10/2004 | Waterhouse et al. |
| 2005/0010333 A1 | 1/2005 | Lorton et al. |
| 2005/0026181 A1 | 2/2005 | Davis et al. |
| 2005/0097997 A1 | 5/2005 | Hile |
| 2005/0108912 A1 | 5/2005 | Bekker |
| 2005/0115508 A1 | 6/2005 | Little |
| 2005/0128086 A1 | 6/2005 | Brown et al. |
| 2005/0139168 A1 | 6/2005 | Light et al. |
| 2005/0145187 A1 | 7/2005 | Gray |
| 2005/0273117 A1 | 12/2005 | Teychene |

(56) References Cited

U.S. PATENT DOCUMENTS

| | | |
|---|---|---|
| 2005/0279287 A1 | 12/2005 | Kroeker |
| 2005/0284381 A1 | 12/2005 | Bell et al. |
| 2006/0011145 A1 | 1/2006 | Kates |
| 2006/0052986 A1 | 3/2006 | Rogers et al. |
| 2006/0064325 A1 | 3/2006 | Matsumoto et al. |
| 2006/0087440 A1 | 4/2006 | Klein |
| 2006/0106289 A1 | 5/2006 | Elser |
| 2006/0117619 A1 | 6/2006 | Costantini |
| 2006/0155172 A1 | 7/2006 | Rugg |
| 2006/0170561 A1 | 8/2006 | Eyal |
| 2006/0173367 A1 | 8/2006 | Stuart et al. |
| 2006/0185605 A1 | 8/2006 | Renz et al. |
| 2006/0201436 A1 | 9/2006 | Kates |
| 2006/0202835 A1* | 9/2006 | Thibault ............... A01K 11/004 |
| | | 340/572.9 |
| 2006/0207515 A1 | 9/2006 | Palett |
| 2006/0241521 A1 | 10/2006 | Cohen |
| 2006/0282274 A1 | 12/2006 | Bennett |
| 2006/0290514 A1 | 12/2006 | Sakama et al. |
| 2007/0006494 A1 | 1/2007 | Hayes et al. |
| 2007/0008155 A1 | 1/2007 | Trost |
| 2007/0021660 A1 | 1/2007 | DeLonzor et al. |
| 2007/0027375 A1 | 2/2007 | Melker et al. |
| 2007/0027377 A1 | 2/2007 | DeLonzor et al. |
| 2007/0027379 A1 | 2/2007 | Delonzor et al. |
| 2007/0029381 A1 | 2/2007 | Braiman |
| 2007/0044317 A1 | 3/2007 | Critelli |
| 2007/0044732 A1 | 3/2007 | Araki et al. |
| 2007/0062457 A1 | 3/2007 | Bates et al. |
| 2007/0069899 A1 | 3/2007 | Shih et al. |
| 2007/0096875 A1* | 5/2007 | Waterhouse ..... G06K 19/07749 |
| | | 340/572.1 |
| 2007/0103296 A1 | 5/2007 | Paessel et al. |
| 2007/0149871 A1 | 6/2007 | Sarussi et al. |
| 2007/0152825 A1 | 7/2007 | August et al. |
| 2007/0222624 A1 | 9/2007 | Eicken et al. |
| 2007/0229273 A1* | 10/2007 | Hoemann ............ G06K 7/0008 |
| | | 340/572.5 |
| 2007/0236336 A1* | 10/2007 | Borcherding ........ G06K 7/0008 |
| | | 340/572.1 |
| 2007/0255124 A1 | 11/2007 | Pologe et al. |
| 2007/0258625 A1 | 11/2007 | Mirtsching |
| 2007/0283791 A1 | 12/2007 | Engvall et al. |
| 2007/0298421 A1 | 12/2007 | Jiang et al. |
| 2008/0001815 A1 | 1/2008 | Wang et al. |
| 2008/0004798 A1 | 1/2008 | Troxler et al. |
| 2008/0017126 A1 | 1/2008 | Adams et al. |
| 2008/0018481 A1 | 1/2008 | Zehavi |
| 2008/0021352 A1 | 1/2008 | Keegan et al. |
| 2008/0036610 A1 | 2/2008 | Hokuf et al. |
| 2008/0047177 A1 | 2/2008 | Hilpert |
| 2008/0055155 A1 | 3/2008 | Hensley et al. |
| 2008/0059263 A1 | 3/2008 | Stroman et al. |
| 2008/0061990 A1 | 3/2008 | Milnes et al. |
| 2008/0076988 A1 | 3/2008 | Sarussi et al. |
| 2008/0076992 A1 | 3/2008 | Hete et al. |
| 2008/0085522 A1 | 4/2008 | Meghen et al. |
| 2008/0097726 A1 | 4/2008 | Lorton et al. |
| 2008/0110406 A1 | 5/2008 | Anderson |
| 2008/0146890 A1 | 6/2008 | LeBoeuf et al. |
| 2008/0173255 A1 | 7/2008 | Mainini et al. |
| 2008/0186138 A1* | 8/2008 | Butler ................. G06K 19/0723 |
| | | 340/10.1 |
| 2008/0186139 A1* | 8/2008 | Butler ................. G08B 13/2431 |
| | | 340/10.1 |
| 2008/0190202 A1 | 8/2008 | Kulach et al. |
| 2008/0190379 A1 | 8/2008 | Mainini et al. |
| 2008/0215484 A1 | 9/2008 | Oldham |
| 2008/0218344 A1* | 9/2008 | Lazar ................. G06K 7/10039 |
| | | 340/572.1 |
| 2008/0227662 A1 | 9/2008 | Stromberg et al. |
| 2008/0228105 A1 | 9/2008 | Howell et al. |
| 2008/0252426 A1* | 10/2008 | Lee ................... G06K 19/0701 |
| | | 340/10.3 |
| 2008/0262326 A1 | 10/2008 | Hete et al. |
| 2008/0272908 A1 | 11/2008 | Boyd |
| 2008/0312511 A1 | 12/2008 | Osler et al. |
| 2009/0009388 A1 | 1/2009 | Wangrud |
| 2009/0020613 A1 | 1/2009 | Chang et al. |
| 2009/0025651 A1 | 1/2009 | Lalor |
| 2009/0058614 A1* | 3/2009 | Roz ........................ H04B 7/00 |
| | | 340/10.4 |
| 2009/0058730 A1 | 3/2009 | Geissler et al. |
| 2009/0064548 A1 | 3/2009 | Vilaseca Vintro |
| 2009/0094869 A1 | 4/2009 | Geissler et al. |
| 2009/0102668 A1 | 4/2009 | Thompson et al. |
| 2009/0139462 A1 | 6/2009 | So |
| 2009/0149727 A1 | 6/2009 | Truitt et al. |
| 2009/0187392 A1 | 7/2009 | Riskey et al. |
| 2009/0251291 A1* | 10/2009 | Borcherding ...... G06K 7/10128 |
| | | 340/10.1 |
| 2009/0255484 A1 | 10/2009 | Muelken |
| 2009/0289771 A1* | 11/2009 | Tuttle ................. G06K 7/10346 |
| | | 340/10.3 |
| 2009/0312667 A1 | 12/2009 | Utsunomiya et al. |
| 2010/0018363 A1 | 1/2010 | Chervenak et al. |
| 2010/0030036 A1 | 2/2010 | Mottram et al. |
| 2010/0045468 A1 | 2/2010 | Geissler |
| 2010/0064985 A1 | 3/2010 | Jacobsen et al. |
| 2010/0113902 A1 | 5/2010 | Hete et al. |
| 2010/0134257 A1* | 6/2010 | Puleston ............... G06K 7/0008 |
| | | 340/10.4 |
| 2010/0139575 A1 | 6/2010 | Duncan et al. |
| 2010/0160809 A1 | 6/2010 | Laurence et al. |
| 2010/0175625 A1 | 7/2010 | Klenotiz |
| 2010/0217102 A1 | 8/2010 | LeBoeuf et al. |
| 2010/0250198 A1 | 9/2010 | Lorton et al. |
| 2010/0289617 A1* | 11/2010 | Hill ................... G06K 7/10366 |
| | | 340/5.1 |
| 2010/0289639 A1 | 11/2010 | Gibson et al. |
| 2010/0289662 A1* | 11/2010 | Dasilva ................. G01V 15/00 |
| | | 340/686.6 |
| 2010/0315241 A1 | 12/2010 | Jow |
| 2010/0321182 A1 | 12/2010 | Wangrud |
| 2010/0321189 A1 | 12/2010 | Gibson et al. |
| 2010/0331739 A1 | 12/2010 | Maltz et al. |
| 2011/0018717 A1 | 1/2011 | Takahashi et al. |
| 2011/0041367 A1 | 2/2011 | Bladen et al. |
| 2011/0061605 A1 | 3/2011 | Hardi et al. |
| 2011/0095089 A1 | 4/2011 | Kolton et al. |
| 2011/0121356 A1 | 5/2011 | Krawinkel et al. |
| 2011/0137185 A1 | 6/2011 | Hete et al. |
| 2011/0152876 A1 | 6/2011 | Vandeputte |
| 2011/0178423 A1 | 7/2011 | Hatch |
| 2011/0203144 A1 | 8/2011 | Junek et al. |
| 2011/0258130 A1 | 10/2011 | Grabiner et al. |
| 2011/0272470 A1 | 11/2011 | Baba et al. |
| 2011/0313264 A1 | 12/2011 | Hete et al. |
| 2012/0009943 A1 | 1/2012 | Greenberg et al. |
| 2012/0068848 A1 | 3/2012 | Campbell et al. |
| 2012/0089152 A1 | 4/2012 | Lynd et al. |
| 2012/0092132 A1 | 4/2012 | Holme et al. |
| 2012/0111286 A1 | 5/2012 | Lee et al. |
| 2012/0112917 A1 | 5/2012 | Menachem et al. |
| 2012/0160181 A1 | 6/2012 | So et al. |
| 2012/0175412 A1 | 7/2012 | Grabiner et al. |
| 2012/0204811 A1 | 8/2012 | Ryan |
| 2012/0236690 A1 | 9/2012 | Rader et al. |
| 2012/0291715 A1 | 11/2012 | Jiang et al. |
| 2012/0299731 A1 | 11/2012 | Triener |
| 2012/0325153 A1 | 12/2012 | Mostert |
| 2012/0326862 A1 | 12/2012 | Kwak et al. |
| 2012/0326874 A1 | 12/2012 | Kwak et al. |
| 2013/0006065 A1 | 1/2013 | Yanai et al. |
| 2013/0014706 A1 | 1/2013 | Menkes |
| 2013/0015960 A1* | 1/2013 | Kaga ................. G06K 19/07767 |
| | | 340/10.51 |
| 2013/0046170 A1 | 2/2013 | Haynes |
| 2013/0096369 A1* | 4/2013 | Folkers ................. A01K 29/005 |
| | | 600/33 |
| 2013/0113622 A1 | 5/2013 | Pratt et al. |
| 2013/0119142 A1 | 5/2013 | McCoy et al. |

(56) References Cited

U.S. PATENT DOCUMENTS

| | | |
|---|---|---|
| 2013/0175347 A1 | 7/2013 | Decaluwe et al. |
| 2013/0192526 A1 | 8/2013 | Mainini |
| 2013/0211773 A1 | 8/2013 | Loeschinger et al. |
| 2013/0222141 A1* | 8/2013 | Rhee ............... G16H 50/80 340/573.3 |
| 2013/0237778 A1 | 9/2013 | Rouquette et al. |
| 2013/0239904 A1 | 9/2013 | Kim et al. |
| 2013/0239907 A1 | 9/2013 | Laurence et al. |
| 2013/0265165 A1 | 10/2013 | So et al. |
| 2013/0282295 A1 | 10/2013 | White et al. |
| 2013/0285815 A1 | 10/2013 | Jones, II |
| 2014/0073486 A1 | 3/2014 | Ahmed et al. |
| 2014/0122488 A1 | 5/2014 | Jung et al. |
| 2014/0123912 A1 | 5/2014 | Menkes et al. |
| 2014/0135596 A1 | 5/2014 | LeBoeuf et al. |
| 2014/0135631 A1 | 5/2014 | Brumback et al. |
| 2014/0171762 A1 | 6/2014 | LeBoeuf et al. |
| 2014/0174376 A1 | 6/2014 | Touchton et al. |
| 2014/0196673 A1 | 7/2014 | Menkes et al. |
| 2014/0230755 A1 | 8/2014 | Trenkle et al. |
| 2014/0232541 A1 | 8/2014 | Trenkle et al. |
| 2014/0253709 A1 | 9/2014 | Bresch et al. |
| 2014/0261235 A1 | 9/2014 | Rich et al. |
| 2014/0267299 A1 | 9/2014 | Couse |
| 2014/0275824 A1 | 9/2014 | Couse |
| 2014/0276089 A1 | 9/2014 | Kirenko et al. |
| 2014/0290013 A1 | 10/2014 | Eidelman et al. |
| 2014/0302783 A1 | 10/2014 | Aiuto et al. |
| 2014/0331942 A1 | 11/2014 | Sarazyn |
| 2014/0333439 A1 | 11/2014 | Downing et al. |
| 2014/0347184 A1 | 11/2014 | Triener |
| 2014/0352632 A1 | 12/2014 | McLaughlin |
| 2014/0368338 A1 | 12/2014 | Rettedal et al. |
| 2015/0025394 A1 | 1/2015 | Hong et al. |
| 2015/0039239 A1 | 2/2015 | Shuler et al. |
| 2015/0057963 A1 | 2/2015 | Zakharov et al. |
| 2015/0097668 A1 | 4/2015 | Toth |
| 2015/0099472 A1 | 4/2015 | Ickovic |
| 2015/0100245 A1 | 4/2015 | Huang et al. |
| 2015/0107519 A1 | 4/2015 | Rajkondawar et al. |
| 2015/0107522 A1 | 4/2015 | Lamb |
| 2015/0109130 A1 | 4/2015 | Rajkondawar et al. |
| 2015/0122893 A1 | 5/2015 | Warther |
| 2015/0128873 A1 | 5/2015 | Prescott et al. |
| 2015/0130617 A1 | 5/2015 | Triener |
| 2015/0148811 A1 | 5/2015 | Swope et al. |
| 2015/0157435 A1 | 6/2015 | Chasins et al. |
| 2015/0182322 A1 | 7/2015 | Couse et al. |
| 2015/0245592 A1 | 9/2015 | Sibbald et al. |
| 2015/0282457 A1 | 10/2015 | Yarden |
| 2015/0334994 A1 | 11/2015 | Prasad |
| 2015/0342143 A1 | 12/2015 | Stewart |
| 2015/0351885 A1 | 12/2015 | Kool et al. |
| 2015/0366166 A1 | 12/2015 | Mueller |
| 2016/0000045 A1 | 1/2016 | Funaya et al. |
| 2016/0021506 A1 | 1/2016 | Bonge, Jr. |
| 2016/0058379 A1 | 3/2016 | Menkes et al. |
| 2016/0066546 A1 | 3/2016 | Borchersen et al. |
| 2016/0100802 A1 | 4/2016 | Newman |
| 2016/0106064 A1 | 4/2016 | Bladen et al. |
| 2016/0113524 A1 | 4/2016 | Gross et al. |
| 2016/0117583 A1* | 4/2016 | Butler ............... H04L 67/04 340/10.51 |
| 2016/0120154 A1* | 5/2016 | Hill ............... G08C 17/02 340/573.3 |
| 2016/0128637 A1 | 5/2016 | LeBoeuf et al. |
| 2016/0135431 A1 | 5/2016 | Sheldon et al. |
| 2016/0148086 A1 | 5/2016 | Clarke et al. |
| 2016/0150362 A1 | 5/2016 | Shaprio et al. |
| 2016/0151013 A1 | 6/2016 | Atallah et al. |
| 2016/0165851 A1 | 6/2016 | Harty et al. |
| 2016/0165852 A1 | 6/2016 | Goldfain |
| 2016/0166761 A1 | 6/2016 | Piehl et al. |
| 2016/0198957 A1 | 7/2016 | Arditi et al. |
| 2016/0203347 A1* | 7/2016 | Bartholomew .... G06K 7/10158 340/539.23 |
| 2016/0210841 A1 | 7/2016 | Huang et al. |
| 2016/0213317 A1 | 7/2016 | Richardson et al. |
| 2016/0278712 A1 | 9/2016 | Sagara et al. |
| 2016/0286757 A1 | 10/2016 | Armstrong |
| 2016/0287108 A1 | 10/2016 | Wei et al. |
| 2016/0317049 A1 | 11/2016 | LeBoeuf et al. |
| 2016/0345881 A1 | 12/2016 | Sarantos et al. |
| 2016/0360733 A1 | 12/2016 | Triener |
| 2016/0367495 A1 | 12/2016 | Miller et al. |
| 2017/0000090 A1 | 1/2017 | Hall |
| 2017/0006836 A1 | 1/2017 | Torres |
| 2017/0042119 A1 | 2/2017 | Garrity |
| 2017/0067770 A1 | 3/2017 | Sun |
| 2017/0079247 A1 | 3/2017 | Womble et al. |
| 2017/0095206 A1 | 4/2017 | Leib et al. |
| 2017/0156288 A1 | 6/2017 | Singh |
| 2017/0164905 A1 | 6/2017 | Gumiero |
| 2017/0193208 A1 | 7/2017 | Ashley et al. |
| 2017/0196203 A1 | 7/2017 | Huisma et al. |
| 2017/0202185 A1 | 7/2017 | Trumbull et al. |
| 2017/0245797 A1 | 8/2017 | Quinn |
| 2017/0258039 A1 | 9/2017 | Lauterbach |
| 2017/0272842 A1 | 9/2017 | Touma |
| 2017/0280675 A1 | 10/2017 | MacNeil et al. |
| 2017/0280687 A1 | 10/2017 | Vrabete et al. |
| 2017/0280688 A1 | 10/2017 | Deliou et al. |
| 2017/0318781 A1 | 11/2017 | Rollins et al. |
| 2017/0360004 A1 | 12/2017 | Carver |
| 2017/0372583 A1 | 12/2017 | Lamkin et al. |
| 2018/0000045 A1 | 1/2018 | Bianchi et al. |
| 2018/0007863 A1 | 1/2018 | Bailey et al. |
| 2018/0014512 A1 | 1/2018 | Arabani et al. |
| 2018/0027772 A1 | 2/2018 | Gordon et al. |
| 2018/0055016 A1 | 3/2018 | Hsieh et al. |
| 2018/0064068 A1 | 3/2018 | McKee et al. |
| 2018/0070559 A1 | 3/2018 | So et al. |
| 2018/0098522 A1 | 4/2018 | Steinfort |
| 2018/0110205 A1 | 4/2018 | Czarnecky et al. |
| 2018/0113498 A1 | 4/2018 | Cronin et al. |
| 2018/0131074 A1 | 5/2018 | Wilkinson et al. |
| 2018/0132455 A1 | 5/2018 | Pradeep et al. |
| 2018/0146645 A1 | 5/2018 | Arbel |
| 2018/0160649 A1 | 6/2018 | Hicks et al. |
| 2018/0206455 A1 | 7/2018 | Thiex et al. |
| 2018/0242860 A1 | 8/2018 | LeBoeuf et al. |
| 2018/0249683 A1 | 9/2018 | Borchersen et al. |
| 2018/0260976 A1 | 9/2018 | Watanabe et al. |
| 2018/0271058 A1 | 9/2018 | Valdez |
| 2018/0279582 A1 | 10/2018 | Yajima et al. |
| 2018/0288968 A1 | 10/2018 | Cisco et al. |
| 2018/0295809 A1 | 10/2018 | Yajima et al. |
| 2018/0303425 A1 | 10/2018 | Wordham et al. |
| 2018/0310526 A1 | 11/2018 | Birch et al. |
| 2018/0325382 A1 | 11/2018 | Brandao et al. |
| 2018/0332989 A1 | 11/2018 | Chiu et al. |
| 2018/0333244 A1 | 11/2018 | Hanks et al. |
| 2019/0008118 A1 | 1/2019 | Keegan |
| 2019/0008124 A1 | 1/2019 | Komatsu et al. |
| 2019/0029226 A1 | 1/2019 | Triener |
| 2019/0053469 A1 | 2/2019 | Mardirossian |
| 2019/0053470 A1 | 2/2019 | Singh et al. |
| 2019/0059335 A1 | 2/2019 | Crider, Jr. et al. |
| 2019/0059337 A1 | 2/2019 | Robbins |
| 2019/0059741 A1 | 2/2019 | Crider, Jr. et al. |
| 2019/0069512 A1 | 3/2019 | Eriksson et al. |
| 2019/0075945 A1 | 3/2019 | Strassburger et al. |
| 2019/0082654 A1 | 3/2019 | Robbins |
| 2019/0090754 A1 | 3/2019 | Brandao et al. |
| 2019/0110433 A1 | 4/2019 | Myers |
| 2019/0110436 A1 | 4/2019 | Gardner et al. |
| 2019/0125509 A1 | 5/2019 | Hotchkin |
| 2019/0130728 A1 | 5/2019 | Struhsaker et al. |
| 2019/0133086 A1 | 5/2019 | Katz et al. |
| 2019/0159428 A1 | 5/2019 | Bolen |
| 2019/0166802 A1 | 6/2019 | Seltzer et al. |
| 2019/0183091 A1 | 6/2019 | Betts-LaCroix et al. |
| 2019/0183092 A1 | 6/2019 | Couse et al. |

(56) References Cited

U.S. PATENT DOCUMENTS

| | | |
|---|---|---|
| 2019/0208358 A1 | 7/2019 | DeBarros et al. |
| 2019/0213860 A1 | 7/2019 | Shaprio et al. |
| 2019/0254599 A1 | 8/2019 | Young et al. |
| 2019/0287429 A1 | 9/2019 | Dawson et al. |
| 2019/0290133 A1 | 9/2019 | Crider et al. |
| 2019/0290847 A1 | 9/2019 | Veyrent et al. |
| 2019/0298226 A1 | 10/2019 | Filipowicz |
| 2019/0298924 A1 | 10/2019 | Gibson et al. |
| 2019/0327939 A1 | 10/2019 | Sharpe et al. |
| 2019/0335715 A1 | 11/2019 | Hicks et al. |
| 2019/0350168 A1 | 11/2019 | Shi |
| 2019/0365324 A1 | 12/2019 | Chang |
| 2019/0373857 A1 | 12/2019 | Leigh-Lancaster et al. |
| 2019/0380311 A1 | 12/2019 | Crouthamel et al. |
| 2019/0385037 A1 | 12/2019 | Robadey et al. |
| 2019/0385332 A1 | 12/2019 | Yajima et al. |
| 2020/0015740 A1 | 1/2020 | Alnofeli et al. |
| 2020/0037886 A1 | 2/2020 | Greer et al. |
| 2020/0068853 A1 | 3/2020 | Radovcic |
| 2020/0085019 A1 | 3/2020 | Gilbert et al. |
| 2020/0100463 A1 | 4/2020 | Rooda et al. |
| 2020/0107522 A1 | 4/2020 | Kersey et al. |
| 2020/0110946 A1 | 4/2020 | Kline et al. |
| 2020/0113728 A1 | 4/2020 | Spector et al. |
| 2020/0137983 A1 | 5/2020 | Nieveen et al. |
| 2020/0170222 A1 | 6/2020 | Gotts |
| 2020/0178505 A1 | 6/2020 | Womble et al. |
| 2020/0178800 A1 | 6/2020 | Geissler et al. |
| 2020/0205381 A1 | 7/2020 | Wernimont et al. |
| 2020/0229391 A1 | 7/2020 | De Groot |
| 2020/0229707 A1 | 7/2020 | Donnelly |
| 2020/0242551 A1 | 7/2020 | Lau et al. |
| 2020/0281151 A1 | 9/2020 | Schmidt et al. |
| 2024/0090473 A1* | 3/2024 | Fichman ............ A01K 11/006 |

FOREIGN PATENT DOCUMENTS

| | | |
|---|---|---|
| AU | 2003238759 | 1/2004 |
| AU | 2004263067 | 2/2005 |
| AU | 2004305403 | 7/2005 |
| AU | 2011210083 | 8/2011 |
| AU | 2016266101 | 12/2016 |
| AU | 2017100469 | 5/2017 |
| AU | 2018220079 | 9/2018 |
| BR | 8701673 | 3/2009 |
| BR | 112012018909 | 1/2011 |
| CA | 2267812 | 10/2000 |
| CA | 2493331 | 1/2005 |
| CA | 2788153 | 8/2011 |
| CA | 2880138 | 2/2013 |
| CA | 2858905 | 10/2013 |
| CA | 2875637 | 1/2014 |
| CA | 2875578 | 12/2014 |
| CA | 2915843 | 12/2014 |
| CA | 2990620 | 12/2016 |
| CA | 2916286 | 6/2017 |
| CA | 3007296 | 6/2017 |
| CN | 1989895 | 7/2007 |
| CN | 201171316 | 12/2008 |
| CN | 101578516 | 11/2009 |
| CN | 101816290 | 9/2010 |
| CN | 101875975 | 11/2010 |
| CN | 101875976 | 11/2010 |
| CN | 102781225 | 1/2011 |
| CN | 102142116 | 8/2011 |
| CN | 102485892 | 6/2012 |
| CN | 102682322 | 9/2012 |
| CN | 203313865 | 12/2013 |
| CN | 203689049 | 2/2014 |
| CN | 203523519 | 4/2014 |
| CN | 204047531 | 8/2014 |
| CN | 204305813 | 5/2015 |
| CN | 204331349 | 5/2015 |
| CN | 105191817 | 12/2015 |
| CN | 106125648 | 11/2016 |
| CN | 106172068 | 12/2016 |
| CN | 106197675 | 12/2016 |
| CN | 106719037 | 2/2017 |
| CN | 205919898 | 2/2017 |
| CN | 106472347 | 3/2017 |
| CN | 106845598 | 6/2017 |
| CN | 206431665 | 8/2017 |
| CN | 107201409 | 9/2017 |
| CN | 207201674 | 9/2017 |
| CN | 107251851 | 10/2017 |
| CN | 107667898 | 2/2018 |
| CN | 108353810 | 2/2018 |
| CN | 207100094 | 3/2018 |
| CN | 207249710 | 4/2018 |
| CN | 108651301 | 5/2018 |
| CN | 108656996 | 5/2018 |
| CN | 108684549 | 5/2018 |
| CN | 108118096 | 6/2018 |
| CN | 108308055 | 7/2018 |
| CN | 109006541 | 8/2018 |
| CN | 109008529 | 8/2018 |
| CN | 108617533 | 10/2018 |
| CN | 108717668 | 10/2018 |
| CN | 108766586 | 11/2018 |
| CN | 109006550 | 12/2018 |
| CN | 208273869 | 12/2018 |
| CN | 109355402 | 2/2019 |
| CN | 109937904 | 3/2019 |
| CN | 109937905 | 3/2019 |
| CN | 109823691 | 5/2019 |
| CN | 110073995 | 5/2019 |
| CN | 110059781 | 7/2019 |
| CN | 110106261 | 8/2019 |
| CN | 110106262 | 8/2019 |
| CN | 110506656 | 11/2019 |
| CN | 210076292 | 2/2020 |
| DE | 633742 | 8/1936 |
| DE | 2850438 | 5/1980 |
| DE | 19629166 | 2/1997 |
| DE | 19826348 | 6/1998 |
| DE | 29906146 | 6/1999 |
| DE | 19911766 | 9/2000 |
| DE | 20018364 | 1/2001 |
| DE | 10001176 | 5/2001 |
| DE | 102004027978 | 12/2005 |
| DE | 202010008325 | 2/2012 |
| DE | 20201301107 | 1/2014 |
| DE | 202016101289 | 4/2016 |
| DK | 140001 | 11/1979 |
| EP | 55127 | 6/1982 |
| EP | 125915 | 11/1984 |
| EP | 0499428 | 8/1992 |
| EP | 513525 | 11/1992 |
| EP | 743043 | 11/1996 |
| EP | 938841 | 2/1998 |
| EP | 898449 | 3/1999 |
| EP | 1076485 | 2/2001 |
| EP | 1445723 | 8/2004 |
| EP | 1479338 | 11/2004 |
| EP | 1521208 | 4/2005 |
| EP | 1907816 | 4/2008 |
| EP | 1961294 | 8/2008 |
| EP | 2028931 | 3/2009 |
| EP | 2172878 | 4/2010 |
| EP | 2453733 | 5/2012 |
| EP | 2465344 | 6/2012 |
| EP | 2488237 | 8/2012 |
| EP | 2528431 | 12/2012 |
| EP | 2534945 | 12/2012 |
| EP | 2657889 | 10/2013 |
| EP | 2664234 | 11/2013 |
| EP | 2728995 | 5/2014 |
| EP | 2879615 | 6/2015 |
| EP | 2955998 | 12/2015 |
| EP | 3153098 | 4/2017 |
| EP | 3164855 | 5/2017 |
| EP | 3210531 | 8/2017 |
| EP | 3217566 | 9/2017 |
| EP | 3218865 | 9/2017 |

(56) References Cited

FOREIGN PATENT DOCUMENTS

| | | |
|---|---|---|
| EP | 3225106 | 10/2017 |
| EP | 3316680 | 5/2018 |
| EP | 3346422 | 7/2018 |
| EP | 3385886 | 10/2018 |
| EP | 3593634 | 1/2020 |
| EP | 3627856 | 3/2020 |
| EP | 3660855 | 6/2020 |
| EP | 4001951 A1 | 5/2022 |
| ES | 2046912 | 2/1994 |
| ES | 2206009 | 5/2004 |
| ES | 2215152 | 10/2004 |
| ES | 1072416 | 7/2010 |
| ES | 2391341 | 11/2012 |
| ES | 1194609 | 10/2017 |
| FI | 20165318 | 6/2017 |
| FR | 2106705 | 5/1972 |
| FR | 2297565 | 8/1976 |
| FR | 2342024 | 1/1983 |
| FR | 2601848 | 1/1988 |
| FR | 2779153 | 12/1999 |
| FR | 2834521 | 7/2003 |
| FR | 2964777 | 3/2012 |
| FR | 3046332 | 1/2016 |
| FR | 3024653 | 2/2016 |
| FR | 3085249 | 9/2018 |
| GB | 588870 | 6/1947 |
| GB | 641394 | 8/1950 |
| GB | 865164 | 4/1961 |
| GB | 1072971 | 6/1967 |
| GB | 1267830 | 3/1972 |
| GB | 1415650 | 11/1975 |
| GB | 2067121 | 7/1981 |
| GB | 2055670 | 7/1983 |
| GB | 2114045 | 8/1983 |
| GB | 2125343 | 3/1984 |
| GB | 2142812 | 1/1985 |
| GB | 2392138 | 2/2004 |
| GB | 2469326 | 10/2010 |
| GB | 2554636 | 9/2016 |
| GB | 2570340 | 7/2019 |
| GB | 2571404 | 8/2019 |
| IN | 201103443 | 12/2011 |
| IN | 200802272 | 6/2016 |
| JP | 57173562 | 11/1982 |
| JP | 7177832 | 7/1995 |
| JP | 2001178692 | 7/2001 |
| JP | 2004292151 | 10/2004 |
| JP | 2005102959 | 4/2005 |
| JP | 5659243 | 1/2011 |
| JP | 2011067178 | 4/2011 |
| JP | 2011087657 | 5/2011 |
| JP | 2013247941 | 6/2012 |
| JP | 2017112857 | 6/2017 |
| JP | 2017002170 | 4/2018 |
| KR | 2003061157 | 7/2003 |
| KR | 2005046330 | 5/2005 |
| KR | 780449 | 11/2007 |
| KR | 101747418 | 1/2011 |
| KR | 20130019970 | 2/2013 |
| KR | 20130057683 | 6/2013 |
| KR | 2013138899 | 12/2013 |
| KR | 2019061805 | 11/2017 |
| KR | 101827311 | 2/2018 |
| KR | 20180035537 | 4/2018 |
| KR | 2018109451 | 10/2018 |
| KR | 20190081598 | 7/2019 |
| KR | 2019091708 | 8/2019 |
| MX | 9600754 | 2/1997 |
| MX | 356331 | 1/2011 |
| NL | 2017104 | 1/2018 |
| NL | 2019186 | 1/2019 |
| NL | 2020275 | 7/2019 |
| NZ | 198486 | 5/1986 |
| NZ | 199494 | 7/1986 |
| NZ | 203924 | 10/1986 |
| NZ | 335702 | 3/2001 |
| NZ | 507129 | 8/2002 |
| NZ | 582984 | 1/2011 |
| RU | 2178711 | 1/2002 |
| RU | 2265324 | 12/2005 |
| SE | 4567 | 3/1893 |
| SE | 5549 | 4/1894 |
| SE | 123213 | 11/1948 |
| SE | 188102 | 3/1964 |
| SU | 1766336 | 10/1992 |
| WO | 1984000468 | 2/1984 |
| WO | 1991011956 | 8/1991 |
| WO | 199302549 | 2/1993 |
| WO | 199822028 | 5/1998 |
| WO | 1998039475 | 9/1998 |
| WO | 1999017658 | 4/1999 |
| WO | 2000062263 | 4/1999 |
| WO | 9945761 | 9/1999 |
| WO | 2000013393 | 3/2000 |
| WO | 2000061802 | 10/2000 |
| WO | 2001033950 | 5/2001 |
| WO | 2001087054 | 11/2001 |
| WO | 2002031629 | 4/2002 |
| WO | 2002085106 | 10/2002 |
| WO | 2003001180 | 1/2003 |
| WO | 2004092920 | 3/2003 |
| WO | 2003087765 | 10/2003 |
| WO | 2003094605 | 11/2003 |
| WO | 2004015655 | 2/2004 |
| WO | 2005104775 | 4/2004 |
| WO | 2006078943 | 1/2005 |
| WO | 2005034617 | 4/2005 |
| WO | 2005104930 | 4/2005 |
| WO | 2005073408 | 8/2005 |
| WO | 2005082132 A2 | 9/2005 |
| WO | 2006021855 | 3/2006 |
| WO | 20060036567 A1 | 4/2006 |
| WO | 2006134197 | 12/2006 |
| WO | 2006135265 | 12/2006 |
| WO | 2007034211 | 3/2007 |
| WO | 2007095684 | 8/2007 |
| WO | 2007122375 | 11/2007 |
| WO | 200801803 A2 | 2/2008 |
| WO | 2008033042 | 3/2008 |
| WO | 2008041839 A1 | 4/2008 |
| WO | 2008052298 | 5/2008 |
| WO | 2008075974 | 6/2008 |
| WO | 2010091686 | 12/2008 |
| WO | 2009034497 | 3/2009 |
| WO | 2009062249 | 5/2009 |
| WO | 2009076325 | 6/2009 |
| WO | 2009089215 | 7/2009 |
| WO | 2009117764 | 10/2009 |
| WO | 2009153779 | 12/2009 |
| WO | 2010008620 | 1/2010 |
| WO | 2010048753 | 5/2010 |
| WO | 2010053811 | 5/2010 |
| WO | 2010068713 | 6/2010 |
| WO | 2010140900 | 12/2010 |
| WO | 2012075480 | 12/2010 |
| WO | 2011039112 | 4/2011 |
| WO | 2011076886 | 6/2011 |
| WO | 2011154949 | 12/2011 |
| WO | 2012071670 | 6/2012 |
| WO | 2013008115 | 1/2013 |
| WO | 2013038326 | 3/2013 |
| WO | 2013082227 | 6/2013 |
| WO | 2015001537 | 7/2013 |
| WO | 2013118121 | 8/2013 |
| WO | 2015024050 | 8/2013 |
| WO | 2013179020 | 12/2013 |
| WO | 2013190423 | 12/2013 |
| WO | 2014020463 | 2/2014 |
| WO | 2014095759 | 6/2014 |
| WO | 2014107766 | 7/2014 |
| WO | 2014118788 | 8/2014 |
| WO | 2014125250 | 8/2014 |
| WO | 2016027271 | 8/2014 |
| WO | 2014140148 | 9/2014 |

(56) References Cited

FOREIGN PATENT DOCUMENTS

| | | |
|---|---|---|
| WO | 2014141084 | 9/2014 |
| WO | 2014194383 | 12/2014 |
| WO | 2014197631 | 12/2014 |
| WO | 2014199363 | 12/2014 |
| WO | 2015009167 | 1/2015 |
| WO | 2015030832 | 3/2015 |
| WO | 2015055709 | 4/2015 |
| WO | 2015086338 | 6/2015 |
| WO | 2016207844 | 6/2015 |
| WO | 2015107354 | 7/2015 |
| WO | 2017001717 | 7/2015 |
| WO | 2017031532 | 8/2015 |
| WO | 2015140486 | 9/2015 |
| WO | 2015158787 | 10/2015 |
| WO | 2015175686 | 11/2015 |
| WO | 2015176027 | 11/2015 |
| WO | 2015197385 | 12/2015 |
| WO | 2016037190 | 3/2016 |
| WO | 2017149049 | 3/2016 |
| WO | 2016053104 | 4/2016 |
| WO | 2016108187 | 7/2016 |
| WO | 2016166748 | 10/2016 |
| WO | 2017001538 | 1/2017 |
| WO | 2017027551 | 2/2017 |
| WO | 2017037479 | 3/2017 |
| WO | 2017066813 | 4/2017 |
| WO | 2017089289 | 6/2017 |
| WO | 2017096256 | 6/2017 |
| WO | 2017121834 | 7/2017 |
| WO | 2018006965 | 1/2018 |
| WO | 2018011736 | 1/2018 |
| WO | 2018019742 | 2/2018 |
| WO | 2020022543 | 7/2018 |
| WO | 2018172976 | 9/2018 |
| WO | 2020060248 | 9/2018 |
| WO | 2018/213180 A1 | 11/2018 |
| WO | 2018203203 | 11/2018 |
| WO | 2019009717 | 1/2019 |
| WO | 2019025138 | 2/2019 |
| WO | 2019046216 | 3/2019 |
| WO | 2019048521 A1 | 3/2019 |
| WO | 2019058752 | 3/2019 |
| WO | 2019071222 | 4/2019 |
| WO | 2019132803 | 7/2019 |
| WO | 2019207561 | 10/2019 |
| WO | 2019226100 A1 | 11/2019 |
| WO | 2019235942 | 12/2019 |
| WO | 2019245978 | 12/2019 |
| WO | 2020003310 | 1/2020 |
| WO | 2020096528 | 5/2020 |
| WO | 2020140013 | 7/2020 |

OTHER PUBLICATIONS

Steensels, Machteld; Maltz, Ephraim; Bahr, Claudia; Berckmans, Daniel; Antler, Aharon; et al., Towards practical application of sensors for monitoring animal health: The effect of post-calving health problems on rumination duration, activity and milk yield, The Journal of Dairy Research; Cambridge vol. 84, Iss. 2, (May 2017): 132-138.

Clark, C., Lyons, N., Millapan, L., Talukder, S., Cronin, G., Kerrisk, K., & Garcia, S. (2015), Rumination and activity levels as predictors of calving for dairy cows, Animal, 9(4), 691-695.

K. Koyama, T. Koyama, M. Sugimoto, N. Kusakari, R. Miura, K. Yoshioka, M. Hirako, Prediction of calving time in Holstein dairy cows by monitoring the ventral tail base surface temperature, The Veterinary Journal, vol. 240, 2018, pp. 1-5, ISSN 1090-0233.

L. Calamari, N. Soriani, G. Panella, F. Petrera, A. Minuti, E. Trevisi, Rumination time around calving: An early signal to detect cows at greater risk of disease, Journal of Dairy Science, vol. 97, Issue 6, 2014, pp. 3635-3647, ISSN 0022-0302.

S. Benaissa, F.A.M. Tuyttens, D. Plets, J. Trogh, L. Martens, L. Vandaele, W. Joseph, B. Sonck, Calving and estrus detection in dairy cattle using a combination of indoor localization and accelerometer sensors, Computers and Electronics in Agriculture, vol. 168, 2020, 105153, ISSN 0168-1699.

N. Soriani, E. Trevisi, L. Calamari, Relationships between rumination time, metabolic conditions, and health status in dairy cows during the transition period, Journal of Animal Science, vol. 90, Issue 12, Dec. 2012, pp. 4544-4554.

The role of sensors, big data and machine learning in modern animal farming; Suresh Neethirajan; Received Jun. 2, 2020; Received in revised form Jun. 30, 2020; Accepted Jul. 3, 2020 Sensing and Bio-Sensing Research 29 (2020) 100367 2214-1804/ © 2020 The Author. Published by Elsevier B.V.

A Review on Determination of Computer Aid Diagnosis and/or Risk Factors Using Data Mining Methods in Veterinary Field Pinar Cihan, Erhan Gökçe, Oya Kalipsiz; Tekirdağ Namik Kemal University, Corlu Faculty of Engineering, Department of Computer Engineering, Tekirda, Turkey. 2019.

Big Data Analytics and Precision Animal Agriculture Symposium: Data to decisions B. J. White, D. E. Amrine, and R. L. Larson Beef Cattle Institute, Kansas State University, Manhattan, KS; © The Author(s) 2018. Published by Oxford University Press on behalf of American Society of Animal Science.

Gasteiner, J.; Boswerger, B.; Guggenberger, T., Practical use of a novel ruminal sensor on dairy farms, Praktische Tierarzt 2012 vol. 93 No. 8 pp. 730 . . . 739 ref.45.

Drying up Cows and the Effect of Different Methods Upon Milk Production; Ralph Wayne, C. H. Eckles, and W. E. Peterson; Division of Dairy Husbandry, University of Minnesota, St. Paul; Research-Article| vol. 16, Issue 1, p. 69-78, Jan. 1, 1933.

Eagan, B. H., B. Eagan, and A. Protopopova. "Behaviour Real-Time spatial tracking identification (BeRSTID) used for cat behaviour monitoring in an animal shelter." Scientific reports 12.1 (2022): 17585.

Garrido-Jurado, Sergio, et al. "Automatic generation and detection of highly reliable fiducial markers under occlusion." Pattern Recognition 47.6 (2014): 2280-2292.

Steve Nadis. "Invisible machine-readable labels that identify and track objects". Retrieved online on Sep. 3, 2023. URL: https://www.wevolver.com/article/invisible-machine-readable-labelsthat-identify-and-track-objects.

\* cited by examiner

ANIMAL MARKING CONTROL SYSTEM AND METHOD

TECHNICAL FIELD

The invention relates to an animal marking control system and method.

BACKGROUND

Livestock identification and monitoring systems are widely used to, inter alia, transmit the location and activity status of the animals to an end-user. These systems may comprise monitoring tags (such as, for example, animal monitoring ear tags, leg bands/tags, neck strap tags, or any other devices that can monitor various parameters relating to the animals) and base station nodes, communicating for example and without limitation, wirelessly), with each other. The base station node receives, for example, the identity, location and activity information from the tags and transfers the data to a web server, where a database stores the tag information. The tag information may then be processed in order to assess health status of each animal and detect situations where a specific animal needs physical attention of a farmer, veterinarian, or the like. In addition, these systems may include a software application that serves as an interface between the end user and the web server, enabling the remote monitoring and tracking of the livestock.

In some cases, these identification or monitoring systems may also include visual and/or sound indicators/markers, such as, for example Light Emitting Diodes (LEDs) and/or sound generators. These visual or sound indicators/markers may be used to facilitate identification of a single animal or a subgroup of animals on a farm. As one example, animals may need to be marked/indicated for specific or individualized medical treatment. This may be useful, for example, in a large farm that may include hundreds, thousands or tens of thousands of animals or also in smaller farms to reduce the workload on the farmer when such marking is needed. As used herein, the terms marker, marking, or indicator, or indicating are used interchangeable to refer to methods, systems and devices for facilitating identification, marking, or indication of an animal, or a group of animals. Using an LED as a visual marker or indicator, for example, has many advantages, such as, for example, high luminous efficiency, small size and long lifetime. For practical reasons, animal identification or monitoring tags must be as small and light-weight as possible. And such electronic tags, are limited by the finite energy capacities of their batteries. A visual or audio indicator/marker, such as for example an LED, may be a substantial power consumer of the tag battery power and therefore may affect its lifetime. Hence, efficient operation of the marker on an identification of monitoring tag is crucial for extending the lifetime of tag's limited power capacity. This may be achieved, inter alia, by utilizing the indicator only when an actual need arises. But, it is challenging to determine accurately and precisely when an indicator will need to be used, without impacting the ultimate functionality and efficiency of the indicator/marker.

There is thus a need in the art for a new animal indicating/marking control system and method.

GENERAL DESCRIPTION

In accordance with a first aspect of the presently disclosed subject matter, there is provided an animal marking control system for marking an animal comprising: at least one transceiver communicatively coupled to a remote base station and configured to exchange data with the remote base station, the transceiver having a plurality of operation modes, each of the operation modes defining a respective frequency of communication of the transceiver with the remote base station; a marker unit configured to selectively mark the animal; and a processing circuitry configured to: cause activation of the transceiver at a first operation mode of the operation modes, wherein in the first operation mode the transceiver communicates with the remote base station in a first frequency of communication; receive an indication of a marking need from the remote base station; upon receipt of the indication of a marking need, cause activation of the transceiver at a second operation mode of the operation modes, wherein in the second operation mode the transceiver communicates with the remote base station in a second frequency of communication; receive marker unit activation instructions; and upon receipt of the marker unit activation instructions, activate the marker unit.

In some cases, the second frequency of communication is higher than the first frequency of communication.

In some cases, a first power consumption rate of the transceiver when operating in the first operation mode is lower than a second power consumption rate of the transceiver when operating in the second operation mode.

In some cases, the marker unit is a Light Emitting Diode.

In some cases, the Light Emitting Diode is capable of providing light in different colors, in accordance with a needed treatment to the animal, so that a first color of the different colors is indicative of a first needed treatment and a second color of the different colors is indicative of a second needed treatment, other than the first needed treatment.

In some cases, the marker unit is a sound generator.

In some cases, the remote base station is a server.

In some cases, the marker unit activation instructions are received from a portable device while the transceiver is operating in the second operation mode.

In some cases, the marker unit activation instructions are received from the remote base station while the transceiver is operating in the second operation mode.

In some cases, the processing circuitry is further configured to deactivate the marker unit upon receipt of deactivation instructions while the transceiver is operating in the second operation mode.

In some cases, the deactivation instructions are received from the remote base station.

In some cases, the deactivation instructions are received from a portable device.

In some cases, the processing circuitry is further configured to cause the transceiver to return to the first operation mode of the operation modes.

In some cases, the animal marking control system, further comprises one or more sensors configured to obtain data related to the animal.

In some cases, the marking need is determined by the remote base station in accordance with an animal state.

In some cases, the animal state is one or more of: an estrous cycle, an illness, a potential illness or a lower welfare KPI score.

In some cases, the transceiver is a wireless transceiver.

In accordance with a second aspect of the presently disclosed subject matter, there is provided a method for marking an animal comprising: causing, by a processing circuitry, activation of a transceiver at a first operation mode of a plurality of operation modes, wherein: (a) the transceiver is communicatively coupled to a remote base station, (b) each of the operation modes defining a respective frequency of communication of the transceiver with the remote base station, and (c) in the first operation mode the transceiver communicates with the remote base station in a first frequency of communication; receiving, by the processing circuitry, an indication of a marking need from the remote base station; upon receipt of the indication of a marking need, causing, by the processing circuitry, activation of the transceiver at a second operation mode of the operation modes, wherein in the second operation mode the transceiver communicates with the remote base station in a second frequency of communication; receiving, by the processing circuitry, marker unit activation instructions; and upon receipt of the marker unit activation instructions, activating, by the processing circuitry, a marker unit configured to selectively mark the animal.

In some cases, the second frequency of communication is higher than the first frequency of communication.

In some cases, a first power consumption rate of the transceiver when operating in the first operation mode is lower than a second power consumption rate of the transceiver when operating in the second operation mode.

In some cases, the marker unit is a Light Emitting Diode.

In some cases, the Light Emitting Diode is capable of providing light in different colors, in accordance with a needed treatment to the animal, so that a first color of the different colors is indicative of a first needed treatment and a second color of the different colors is indicative of a second needed treatment, other than the first needed treatment.

In some cases, the marker unit is a sound generator.

In some cases, the remote base station is a server.

In some cases, the marker unit activation instructions are received from a portable device while the transceiver is operating in the second operation mode.

In some cases, the marker unit activation instructions are received from the remote base station while the transceiver is operating in the second operation mode.

In some cases, the method further comprises deactivating the marker unit upon receipt of deactivation instructions while the transceiver is operating in the second operation mode.

In some cases, the deactivation instructions are received from the remote base station.

In some cases, the deactivation instructions are received from a portable device.

In some cases, the method further comprises causing the transceiver to return to the first operation mode of the operation modes.

In some cases, the marking need is determined by the remote base station in accordance with an animal state.

In some cases, the animal state is one or more of: an estrous cycle, an illness, a potential illness or a lower welfare KPI score.

In some cases, the transceiver is a wireless transceiver.

In accordance with a third aspect of the presently disclosed subject matter, there is provided a non-transitory computer readable storage medium having computer readable program code embodied therewith, the computer readable program code, executable by a processing circuitry to perform a method for marking an animal, the method comprising: causing, by the processing circuitry, activation of a transceiver at a first operation mode of a plurality of operation modes, wherein: (a) the transceiver is communicatively coupled to a remote base station, (b) each of the operation modes defining a respective frequency of communication of the transceiver with the remote base station, and (c) in the first operation mode the transceiver communicates with the remote base station in a first frequency of communication; receiving, by the processing circuitry, an indication of a marking need from the remote base station; upon receipt of the indication of a marking need, causing, by the processing circuitry, activation of the transceiver at a second operation mode of the operation modes, wherein in the second operation mode the transceiver communicates with the remote base station in a second frequency of communication; receiving, by the processing circuitry, marker unit activation instructions; and upon receipt of the marker unit activation instructions, activating, by the processing circuitry, a marker unit configured to selectively mark the animal.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
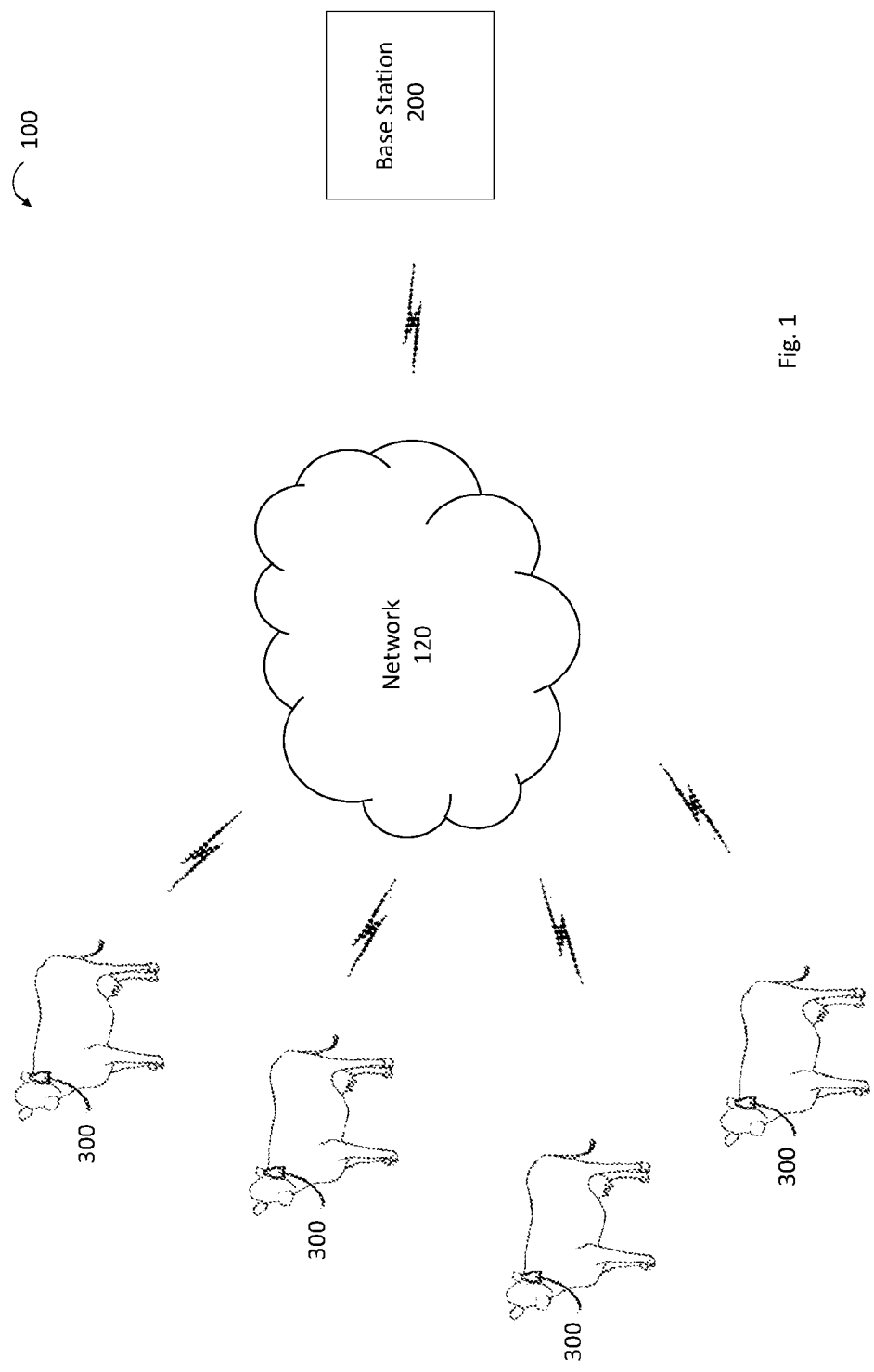
FIG. 1 is a schematic illustration of an exemplary environment for animal marking control system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "communicating", "marking", "transmitting", "causing", "receiving", "activating" or the like, include action and/or processes of a computer that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
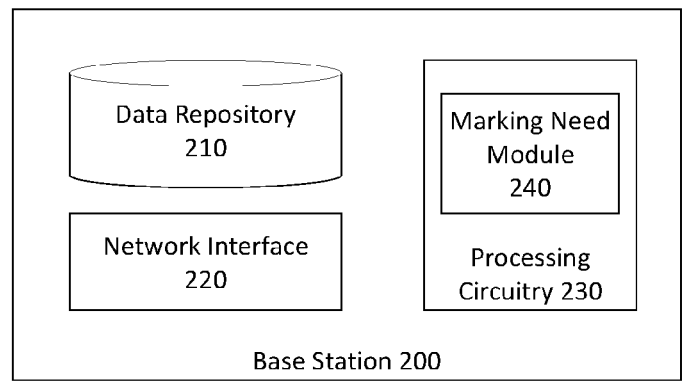
FIG. 2 is a block diagram schematically illustrating one example of a base station, in accordance with the presently disclosed subject matter.
Figure 3:
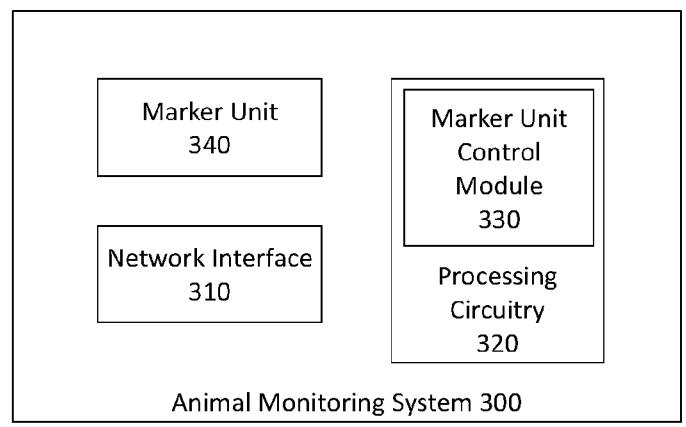
FIG. 3 is a block diagram schematically illustrating one example of an animal marking control system, in accordance with the presently disclosed subject matter.
Figure 4:
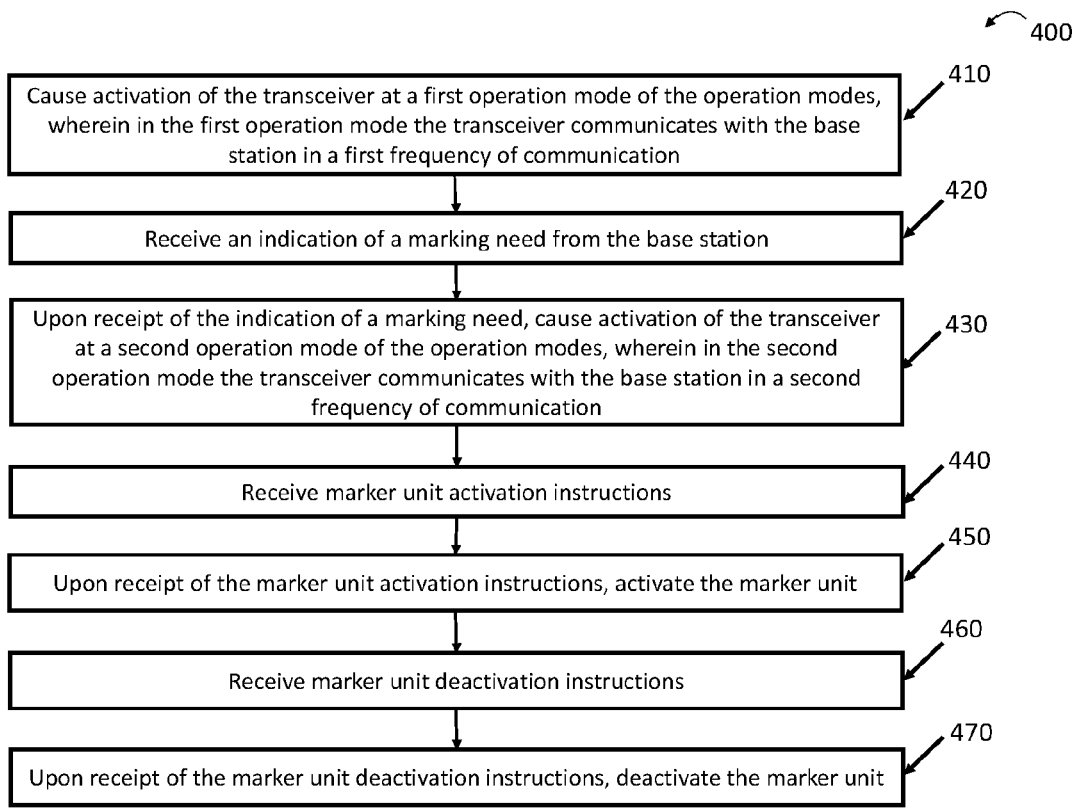
FIG. 4 is a flowchart illustrating one example of a sequence of operations carried out by the animal marking control system, in accordance with the presently disclosed subject matter.
Figure 5:
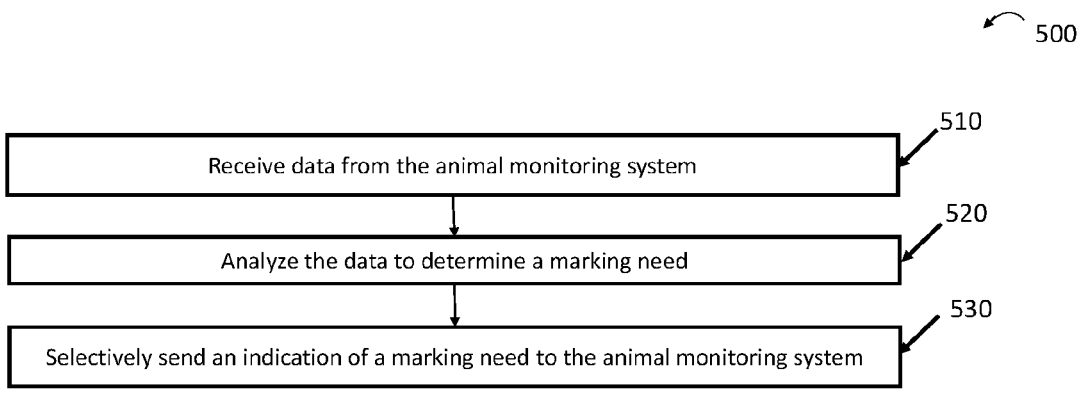
FIG. 5 is a flowchart illustrating one example of a sequence of operations carried out by the base station, in accordance with the presently disclosed subject matter.

In embodiments of the presently disclosed subject matter, fewer, more and/or different stages than those shown in FIGS. 4 and 5 may be executed. In embodiments of the presently disclosed subject matter one or more stages illustrated in FIGS. 4 and 5 may be executed in a different order and/or one or more groups of stages may be executed simultaneously. FIGS. 1-3 illustrates a general schematic of the system architecture in accordance with an embodiment of the presently disclosed subject matter. Each module in FIGS. 1-3 can be made up of any combination of software, hardware and/or firmware that performs the functions as defined and explained herein. The modules in FIGS. 1-3 may be centralized in one location or dispersed over more than one location, as detailed herein. In other embodiments of the presently disclosed subject matter, the system may comprise fewer, more, and/or different modules than those shown in FIGS. 1-3.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1 that shows a schematic illustration of an exemplary environment 100 for animal marking control system, in accordance with the presently disclosed subject matter.

According to the presently disclosed subject matter, the environment 100 includes one or more animal marking control systems 300, a communication network 120 and a base station 200.

The animal marking control system 300 (also referred to herein as "system") may be configured to control a marker unit comprised therein to facilitate identification of an animal that system 300 is attached thereto, by selectively marking the animal. For example, selective marking of single animals may be very useful in big animal farms, for example and without limitation, farms that accommodate hundreds, thousands or tens of thousands of animals, wherein limited labor resource needs to be focused on individual animals that require assistance and for this purpose a specific animal needs to be identified, for example and without limitation, for a veterinary treatment, routine check-ups or vaccinations.

In some cases, system 300 may be also configured to monitor one or more characteristics of an animal for example and without limitation, cattle, pets, fish, swine, poultry, or livestock, and/or various parameters of its surroundings, while being attached to the animal. For example, system 300 may be a monitoring tag fastened to animal's ear, such as illustrated in FIG. 1 for example, wherein an ear tag is attached to an ear of a cow. Another non-limiting examples for system 300 may be a strap attachment to be mounted on animal's neck, a leg band, a floy anchor tag (such as, but not limited to, a T-bar type tag), a fingerling tag or any other configuration that is capable of performing functions described herein.

System 300 may communicate with the base station 200 via communication network 120 by means of wired or wireless communication. Network 120 may be for example and without limitation, a cellular network, a Personal Area Network (PAN) Local Area Network (LAN), a Wireless Local Area Network (WLAN), a Metropolitan Area Network (MAN), Wide Area Network (WAN), Virtual Private Network (VPN), an intranet, an extranet or an Internet.

System 300 and base station 200 may be configured to exchange data therebetween. For example, system 300 may transmit animal related data to the base station 200 and receive operative instructions in return.

The base station 200 may operate in the capacity an antenna or a computing device having data processing capabilities (for example and without limitation, a server, a personal computer (PC), a tablet PC, a set-top box (STB), a Personal Digital Assistant (PDA), a cellular telephone, a web appliance or any other computing device capable of executing a set of instructions (sequential or otherwise) that specify actions to be taken by that computing device). Further, while only a single base station 200 is illustrated, the term base station 200 shall also be taken to include any collection of base stations 200 that individually or jointly execute a set (or multiple sets) of instructions to perform any one or more of the methodologies discussed herein.

Attention is now drawn to FIG. 2, a block diagram schematically illustrating one example of a base station 200, in accordance with the presently disclosed subject matter.

According to certain examples of the presently disclosed subject matter, the base station 200 may include, or be otherwise associated with, a data repository 210 (for example and without limitation, a database, a storage system, a memory including Read Only Memory—ROM, Random Access Memory—RAM, or any other type of memory) configured to store data, optionally including, inter alia, data related to one or more animals and/or various parameters of their surroundings, collected by the sensors of system 300 (as optionally will be detailed herein inter alia with respect to FIG. 3). Data repository 210 may be further configured to enable retrieval and/or update and/or deletion of the data stored therein. It is to be noted that in some cases, data repository 210 may be distributed, while the base station 200 has access to the information stored therein, for example and without limitation, via a wired or wireless network to which base station 200 is able to connect.

The base station 200 may further include a network interface 220 (for example and without limitation, a network card, a Wi-Fi client, a LiFi client, 3G/4G client, or any other component), enabling base station 200 to communicate over the communication network 120 with various systems, such as, for example, system 300.

Base station 200 further comprises a processing circuitry 230. Processing circuitry 230 may be one or more processing units (for example and without limitation, central processing units), microprocessors, microcontrollers (for example and without limitation, microcontroller units (MCUs)) or any other computing devices or modules, including multiple and/or parallel and/or distributed processing units, which are adapted to independently or cooperatively process data for controlling relevant system 300 resources and for enabling operations related to system's 300 resources.

Processing circuitry 230 comprises a marking need module 240, configured to determine system's 300 marking needs in accordance with an animal state. In some cases, the animal state may be determined based on the animal related data transmitted by system 300 to the base station 200, as optionally further detailed herein, inter alia with reference to FIGS. 4 and 5, in order to enable efficient power consumption thereof.

Attention is now drawn to FIG. 3, a block diagram schematically illustrating one example of an animal marking control system 300 in accordance with the presently disclosed subject matter.

According to certain examples of the presently disclosed subject matter, the animal marking control system 300 (also referred to herein as "system") may include a network interface 310 (for example and without limitation, a network card, a Wi-Fi client, a LiFi client, 3G/4G client, or any other component), enabling system 300 to communicate over the communication network 120 with various systems, such as, for example, base station 200 (as optionally further detailed herein). In some cases, the network interface 310 may be a transceiver, for example and without limitation, a wireless RF transceiver, or a transmitter that may transmit or broadcast waves, for example and without limitation, radio frequency (RF) waves, to the base station 200.

System 300 may further include a marker unit 340 that may facilitate identification of an animal that system 300 is attached thereto, by selectively marking or identifying the animal. The marker unit 340 may be an electronic component that is configured to automatically trigger a marker or indicating device comprised therein, in accordance with an activation regime dictated by a marker unit control module 330, as optionally further described herein. The marker may be for example a sound or light generator, for example and without limitation, a Light Emitting Diode.

It is to be noted that in some cases the entirety of the marker unit 340 may be a visual, for example and without limitation, any kind of light source, and/or sound indicator or marker, such as, for example, Light Emitting Diode (LED) and/or sound generator.

It is to be also noted that the marker unit 340 and/or the marker and/or the indicating device (as optionally further described herein) do not necessarily physically mark the animal and/or a group of animals in the presently disclosed subject matter. As described herein, the marking or indication of an animal can be achieved by an LED or a sounds generator.

System 300 further comprises a processing circuitry 320. Processing circuitry 320 may be one or more processing units (for example and without limitation, central processing units), microprocessors, microcontrollers (for example and without limitation, microcontroller units (MCUs)) or any other computing devices or modules, including multiple and/or parallel and/or distributed processing units, which are adapted to independently or cooperatively process data for controlling relevant system 300 resources and for enabling operations related to system's 300 resources.

Processing circuitry 320 comprises a marker unit control module 330, configured to control the marker unit 340 operation modes (for example and without limitation, by scheduling a predetermined activation regime and/or activating on demand), as optionally further detailed herein, inter alia with reference to FIGS. 4 and 5, in order to enable efficient power consumption thereof.

As described hereinabove with respect to FIG. 2, system 300 includes at least one transceiver communicatively coupled (for example and without limitation, via communication network 120) to a remote base station 200 and configured to exchange data therewith (i.e., transmit data to the base station and receive data therefrom). The transceiver may have a plurality of operation modes wherein each of the operation modes defining a respective frequency of communication of the transceiver with the base station 200.

System 300 may further include one or more sensors configured to obtain data related to the animal and/or various parameters of its surroundings, while being attached to the animal. The data collected by the sensors may include, for example: (a) physiological information collected from the animal's body, such as, for example, its temperature, heart rate, biometric information, velocity, acceleration (optionally directional acceleration), spatial orientation, (b) environmental information about the environment of the animal, such as, for example, the ambient temperature, ambient moisture (c) geo-spatial information such as, for example but not limited to, animal's geographical location or relative location. Accordingly, the sensors may include one or more of the following: a vibration sensor, a gyroscope, a magnetometer, a pedometer, a location sensor, for example and without limitation, a Global Positioning System receiver, a heart rate sensor or a moisture sensor.

In some cases, the data may be transmitted by the transceiver to the base station 300 in its original form (i.e., unprocessed raw data as obtained by the sensors) while in other cases the data may be processed or pre-processed by the processing circuitry 320 in accordance with predetermined policies and/or "real-time" instructions dictated by the base station 200.

Turning to FIG. 4, there is shown a flowchart illustrating one example of a sequence of operations carried out by the animal marking control system 300, in accordance with the presently disclosed subject matter.

According to certain examples of the presently disclosed subject matter, system 300 may be configured to execute a marker unit activation process shown in FIG. 4, for example and without limitation, by utilizing the marker unit control module 330.

For this purpose, the processing circuitry 320 may be configured to cause activation of the transceiver at a first operation mode of the operation modes, wherein in the first operation mode the transceiver communicates with the base station 200 in a first frequency of communication (block 410). The first operation mode may be a regular communication routine of system 300, wherein the transceiver transmits data obtained by the sensors to the base station 200, in a first frequency of communication. The frequency of communication may be determined based on user's requirements and needs (for example livestock farming may require a more frequent monitoring regime than a fish farming). In the first frequency of communication, system 300 may communicate in a periodic manner with the base station 200 in predetermined time cycles, for example and without limitation, every twenty-four hours, every hour, every 20 minutes, or any other time cycles that may be determined based for example on users' requirements and/or needs.

In the first operation mode the transceiver may be in a sleep mode (such as, but not limited to, off state) and wake up (such as, but not limited to, turned on) in a periodic manner for exchanging data with the base station 200. For example, if the first frequency of communication is 20 minutes the transceiver wakes up every 20 minutes and transmits animal related data to the base station 200 and optionally receives operative instructions in return (as optionally further described hereinbelow). Upon completion of the data exchange between the transceiver and the base station 200, the transceiver returns to its sleep mode until expiration of the time period associated with the first frequency of communication. Such operation mode enables reduced power consumption rates of system 300 compared to other operation modes wherein the transceiver communicates with the base station 200 at a higher frequency of communication, higher than the first frequency of communication thereof. For example, in a firmware update mode, the transceiver may wake up every few tens of milliseconds (for example and without limitation, for a few milliseconds) for exchanging data with the base station 200 (for example and without limitation, for transmitting a new firmware by the base station 200 to system 300). Such operation mode has higher power consumption rates of system 300 compared to power consumption rates thereof when the transceiver is operating in the first operation mode, as optionally detailed herein above. In another example, the first operation mode has reduced power consumption rates of system 300 compared to an operation mode wherein the transceiver is constantly on.

It is to be noted that in some cases, the processing circuitry 320 may be configured to cause activation of the transceiver at another operation mode of the operation modes, wherein the transceiver communicates with the base station 200 in another frequency of communication, other than the first or the second frequency of communication (as optionally further detailed herein below with respect to block 430 of FIG. 4), that may have an ultra-low power consumption rates compared to power consumption rates optionally described herein above. Moreover, such activation may be triggered by the base station 200 at a predetermined time. For example, the transceiver may be activated to communicate with the base station 200 every eight hours wherein such activation instructions may be received daily at approximately 10 pm. During such operation mode the transceiver may enter the sleep mode (such as, but not limited to, off state) at approximately 10 pm and wake up (such as, but not limited to, turn on) for exchanging data with the base station 200 at approximately 6 am, thereby consume ultra-low power rates. During this time slot, where the transceiver is in the sleep mode, the animals would most likely be sleeping or resting and therefore communication between the transceiver and the base station 200 is redundant.

Before continuing the description of the marker unit activation process shown in FIG. 4, attention is currently drawn to FIG. 5, showing a flowchart illustrating one example of a sequence of operations carried out by the base station 200, in accordance with the presently disclosed subject matter.

According to certain examples of the presently disclosed subject matter, base station 200 may be configured to execute a marking need determination process shown in FIG. 5, for example and without limitation, by utilizing the marking need module 240.

For this purpose, the processing circuitry 230 may be configured to receive data (for example and without limitation, via communication network 120) from the animal marking control system 300 (block 510). The data may be a raw data, obtained by the sensors of system 300, related to animal's physiological parameters (such as, but not limited to, temperature or heart rate), processed data, partially processed data, analyzed data, and/or activity information of the animal (such as, but not limited to, its rumination trend or level of activity).

Processing circuitry 230 is further configured to analyze the data to determine a marking need (block 520). For example, marking needs may arise in big animal farms (for example and without limitation, farms that accommodate hundreds, thousands or tens of thousands of animals) wherein limited labor resource needs to be focused on individual animals that require assistance and for this purpose a specific animal, or a sub group of animals, needs to be identified, for example and without limitation, for a veterinary treatment, routine check-ups or vaccinations.

For this purpose, processing circuitry 230 analyzes the data in order to determine if the animal or a sub group of animals, associated with respective system 300 needs to be identified for any reason. For example, a specific animal or a sub group of animals, may need to be identified for receiving a physical attention of a farmer, veterinarian or the like, for various reasons and/or purposes, such as but not limited to, separation from the herd (for example and without limitation, for slaughtering purposes or moving to another facility or location), administering a special diet and/or treatment or treating sick animals.

For example, recognizing unusual behavioral patterns of an individual animal in a dairy farm may lead to a determination that the animal is sick and needs to be identified for receiving a physical attention of a farmer, veterinarian or the like. Behavioral patterns may include inter alia standing, lying, ruminating, eating, normal and lame walking, lying down, standing up, and so on. In another example, detecting temperature above or below a predetermined threshold may indicate a possible medical issue, such as, for example, a respiratory infection in cattle.

In another example, rumination time of a dairy cow is a direct derivative of its eating time. That is, following periods of high eating times and intakes, cows spend more time ruminating. Typically, dairy cows ruminate about 30% of the day. Hence, rumination trend of a dairy cow may indicate its health state (as sick cows tend to eat less and consequently ruminate less). Processing circuitry 230 analyzes rumination times monitored by system 300 to detect significant decrease(s) therein, and optionally compares these times to normal and/or past behavior of the cow associated with system 300. In some cases, the rumination periods may be correlated with additional and/or other characteristics of the cow (such as, but not limited to, its level of activity). Upon detection of a sick or potentially sick cow, the processing circuitry 230 enters the cow to an ill animal section of a health report. The health report may be a specific report related to a single inhabitant of the farm or a comprehensive listing of all the animals accommodated in the farm and their characteristics. Various information may be included in the report, from routine changes in a group of animals, each monitored by a respective system 300, to a numeric score for the likelihood of disease for a particular animal in the farm.

In yet another example, level of activity of dairy cows may also indicate illness. Activity levels, measured by system 300 may be analyzed by processing circuitry 230 to detect significant decrease(s) and/or increase(s) therein, and optionally compared to normal and/or past behavior of the cow associated with system 300. For example, activity levels above normal and/or past behavior of the cow may indicate an abnormally high body temperature thereof, and hence indicate its health state (as sick cows with fever tend to move more). In some cases, time duration(s) of activity levels' period(s) may be correlated with additional and/or other characteristics of the cow (such as, but not limited to, its rumination times). Upon detection of a sick or potentially sick cow, the processing circuitry 230 enters the cow to the ill animal section of a health report.

The ill animal section of the health report lists all sick or potentially sick animals accommodated in the farm. Additionally, the health report may list various animal states (such as, but not limited to, an estrous cycle, an illness, a potential illness or a lower welfare Key Performance Indicator (KPI) score) that may require identification or separation of a specific animal or a sub group of animals, by a farmer, veterinarian or the like.

The processing circuitry 230 may be further configured to selectively send an indication of a marking need to the animal marking control system 300 (block 530). The marking need may be determined by the base station 200 (for example and without limitation, by the processing circuitry 230) in accordance with the animal state. For example, if a specific animal, associated with a respective system 300 was added to the ill animal section of a health report, the base station 200 will determine that there is a marking need for this particular animal (that is, this animal needs to be identified by a farmer, veterinarian or the like).

It is to be noted that in some cases, the marking need is not necessarily associated with illness of the animal. Marking need may also be determined in cases where a periodic vaccination is due, if an estrous cycle is detected, if there is a need to change a diet or add treatment or any other animal state that requires an identification or separation of a specific animal or a sub group of animals by a farmer, veterinarian or the like.

It is to be further noted that in some cases, the marking need may be requested by a farmer via a portable device (such as, but not limited to, a portable personal computer (PC), a tablet PC, a handheld PC (such as, but not limited to, a Personal Digital Assistant (PDA), a smartphone, or the like), a smartwatch or any other apparatus with appropriate processing capabilities, including an apparatus which may be, for example, specifically configured for that purpose), inter alia, as optionally further described herein below, for various reasons and/or purposes, such as but not limited to, separation from the herd (for example and without limitation, for slaughtering purposes or moving to another facility or location), administering a special diet and/or treatment or treating sick animals. The marking need requested by the farmer via said portable device may be communicated to the base station 200, for example and without limitation, via communication network 120. In other cases, the marking need requested by the farmer via said portable device may be communicated to a cloud, that may be for example and without limitation a web server, optionally through a cellular network. Next, the cloud may communicate said marking need to the base station 200 and the base station 200 may communicate said marking need to respective system 300, in accordance with the presently disclosed subject matter. It is to be noted that yet in other cases, communication between the portable device and at least one system 300 may be direct or indirect, including, but not limited to, via one or more of local/wide area networks (including, but not limited to, a cellular network or a Wi-Fi network), via one or more base stations (such as, for example base station 200) forming part of the local/wide networks, via remote servers.

In general, the marking need may be tailored in correlation with animal state(s) and/or combinations thereof based on user's requirements and needs (such as, but not limited to, based on the animals' type that accommodates the farm). For example, fish farm may have marking need requirements that may optionally differ from marking need requirements of dairy cow farm.

Attention is drawn in this respect back to FIG. 4, illustrating the marker unit activation process. The processing circuitry 320 may be further configured to receive an indication of a marking need from the base station 200 (block 420). The indication of a marking need in fact indicates that the animal or a sub group of animals, wherein each animal is associated with a respective system 300, requires an identification or separation by a farmer, veterinarian or the like.

Upon receipt of the indication of a marking need, the processing circuitry 320 may be further configured to cause activation of the transceiver at a second operation mode of the operation modes, wherein in the second operation mode the transceiver communicates with the base station 200 in a second frequency of communication (block 430). In response to the indication of a marking need the transceiver of a respective system 300 becomes more responsive, i.e. activated at second operation mode wherein it exchanges data with the base station 200 in second frequency of communication in a periodic manner (such as, but not limited to, in predetermined time cycles, for example and without limitation, every minute, every 30 seconds or any other time cycles that may be determined based for example on users' requirements and/or needs). Hence, the second frequency of communication is higher than the first frequency of communication.

In the second operation mode the transceiver may be in a sleep mode (such as, but not limited to, off state) and wake up (such as, but not limited to, turned on) in a periodic manner for exchanging data with the base station 200. For example, if the second frequency of communication is 30 seconds the transceiver wakes up every 30 seconds and transmits animal related data to the base station 200 and receives operative instructions in return (such as, but not limited to, indication of a marking need). Upon completion of the data exchange between the transceiver and the base station 200, the transceiver returns to its sleep mode until expiration of the time period associated with the second frequency of communication.

It is to be noted that a first power consumption rate of the transceiver, when operating in the first operation mode, is lower than a second power consumption rate of the transceiver, when operating in the second operation mode. This enables an efficient use of additional power merely when a justified need arises (such as, but not limited to, when the animal or a sub group of animals, need to be identified or separated by a farmer, veterinarian or the like).

The processing circuitry 320 may be further configured to receive marker unit activation instructions (block 440). The marker unit activation instructions may dictate activation regime of the marker unit 340, comprised by system 300. For example, for a dairy farm with a daily routine where a farmer performs routine check-ups in a specific pen or feedlot between 10-11 am, the activation regime of marker unit 340 comprised by system 300 that is associated with a dairy cow accommodated in this pen or feedlot will be activation of the marker unit 340 between 10-11 am. That is, the activation regime in such cases may be predetermined time slots in accordance with user's requirements and/or needs. In another example of activation regime of predetermined time slots for a beef farm, the marker unit 340 may be activated daily at 6 am and the marker, that may be for example a sound or light generator, for example and without limitation, a Light Emitting Diode, may stay on for six hours.

In other cases, the activation regime may be on demand. For example, the farmer enters a certain pen or feedlot and would like to identify all the animals within such pen or feedlot that require his attention. He may send marker unit activation instructions via a portable device (for example and without limitation, a portable personal computer (PC), a tablet PC, a handheld PC (for example and without limitation, a Personal Digital Assistant (PDA), a smartphone, or the like), a smartwatch or any other apparatus with appropriate processing capabilities, including an apparatus which may be, for example, specifically configured for that purpose).

Upon receipt of the marker unit activation instructions, the processing circuitry 320 may be further configured to activate the marker unit 340 (block 450).

In some cases, the marker unit activation instructions may be received from a portable device (for example and without limitation, a portable personal computer (PC), a tablet PC, a handheld PC (for example and without limitation, a Personal Digital Assistant (PDA), a smartphone, or the like), a smartwatch or any other apparatus with appropriate processing capabilities, including an apparatus which may be, for example, specifically configured for that purpose) while the transceiver is operating in the second operation mode. For example, the transceiver is operating in the second operation mode wherein the second frequency of communication is approximately 30 seconds (it is to be noted that the second frequency of communication may be set according to user's requirements and/or needs, for example and without limitation, it may be approximately 10 seconds, 20 seconds, 1 minute or any other frequency that is suitable for performing the presently disclosed subject matter). As optionally described hereinabove, the transceiver exchanges data with the base station 200 every 30 seconds (for example and without limitation, via communication network 120). In one of these communication cycles, marker unit activation instructions may be received by the base station 200 from a portable device (for example and without limitation, a portable personal computer (PC), a tablet PC, a handheld PC (for example and without limitation, a Personal Digital Assistant (PDA), a smartphone, or the like), a smartwatch or any other apparatus with appropriate processing capabilities, including an apparatus which may be, for example, specifically configured for that purpose), operated for example and without limitation, by the farmer. Next, the base station 200 communicates (for example and without limitation, via communication network 120) the marker unit activation instructions to the respective systems 300 that are associated with the indication of a marking need. Upon receipt of the marker unit activation instructions, the marker unit 340 will be activated by the processing circuitry 320.

In some cases, the marker unit activation instructions may be received from the base station 200 while the transceiver is operating in the second operation mode.

As previously indicated hereinabove, in the second operation mode the transceiver in more responsive than in the first operation mode and therefore may respond swiftly to commands (for example and without limitation, activate the marker unit 340) when they are received from the base station 200.

As previously disclosed herein, the marker unit 340 may be any unit or device that is able to identify the animal, including a visual, for example and without limitation, any kind of light source and/or sound indicator or marker, such as for example a Light Emitting Diode (LED) and/or sound generator.

According to certain examples of the presently disclosed subject matter, the marker unit 340 may be a Light Emitting Diode (LED). The LED may be configured to provide light in various manners, such as but not limited to, a constant light and/or color, a light with varying illumination intensities, a varying color light (i.e. the color may vary in a predetermined manner), a predetermined pattern of light, a flashing light with a predetermined frequency (for example and without limitation, a high flashing frequency may be used for emergency cases whereas a low flashing frequency may be used for routine checkup cases), and/or combination(s) thereof where applicable.

In some cases, the LED may be configured to provide light in different colors and/or patterns and/or intensities and/or frequencies and/or combinations thereof, in accordance with a first reason for identifying the animal (such as, but not limited to, a first needed treatment to the animal). For example, a first color of the different colors may be indicative of a first needed treatment and a second color of the different colors may be indicative of a second needed treatment, other than the first needed treatment. Looking at an example, an ill animal may be associated with a red color while animal that needs to be vaccinated may be associated with a yellow color. In another example, the LED may be configured to provide light in varying frequencies based on the animal state, for example provide low flashing frequency (for example and without limitation, one flash per second) for a healthy animal and high flashing frequency (for example and without limitation, three flashes per second) for an unhealthy animal (such as, but not limited to, dairy cows with high level of activity as optionally described hereinabove).

In some cases, the marker unit 340 may be configured to operate based on the distance between the animal associated with a respective system 300 and user's portable device. For example, if the user is located far from the animal, the marker unit 340 may generate markings as a function of a distance therebetween (for example and without limitation, the farther the user is from the animal the louder sound/brighter light will be generated by marker unit 340).

In some cases, the processing circuitry 320 may be further configured to receive marker unit deactivation instructions (block 460).

In some cases, upon receipt of the marker unit deactivation instructions, the processing circuitry 320 may be further configured to deactivate the marker unit (block 470).

In some cases, the processing circuitry 320 may be further configured to deactivate the marker unit 340 upon receipt of deactivation instructions while the transceiver is operating in the second operation mode. Marker unit deactivation instructions may dictate deactivation regime of the marker unit 340, comprised by system 300. For example, the marker unit 340 may be deactivated upon demand (for example and without limitation, immediately upon receipt of a deactivation demand) or at a predetermined/desired time (for example and without limitation, in an hour).

In some cases, the deactivation instructions may be received from a portable device (for example and without limitation, a portable personal computer (PC), a tablet PC, a handheld PC (for example and without limitation, a Personal Digital Assistant (PDA), a smartphone, or the like), a smartwatch or any other apparatus with appropriate processing capabilities, including an apparatus which may be, for example, specifically configured for that purpose) while the transceiver is operating in the second operation mode. For example, the transceiver is operating in the second operation mode wherein the second frequency of communication is 30 seconds. As optionally described hereinabove, the transceiver exchanges data with the base station 200 every 30 seconds (for example and without limitation, via communication network 120). In one of these communication cycles, the transceiver may receive marker unit deactivation instructions from a portable device (for example and without limitation, a portable personal computer (PC), a tablet PC, a handheld PC (for example and without limitation, a Personal Digital Assistant (PDA), a smartphone, or the like), a smartwatch or any other apparatus with appropriate processing capabilities, including an apparatus which may be, for example, specifically configured for that purpose) operated for example and without limitation, by the farmer, that may communicate therewith for example and without limitation, via communication network 120. Upon receipt of the marker unit deactivation instructions, the marker unit 340 may be deactivated by the processing circuitry 320 in accordance with the deactivation regime as optionally described hereinabove.

In some cases, the deactivation instructions may be received from the base station 200, while the transceiver is operating in the second operation mode.

In some cases, the processing circuitry 320 may be further configured to cause the transceiver to return to the first operation mode of the operation modes. Once the marker unit 340 was deactivated, system 300 may return to its regular operation mode wherein the transceiver operates in the first operation mode, thereby enabling efficient power consumption of the system 300.

It is to be noted, with reference to FIGS. 4 and 5, that some of the blocks may be integrated into a consolidated block or may be broken down to a few blocks and/or other blocks may be added. It should be also noted that whilst the flow diagram is described also with reference to the system elements that realizes them, this is by no means binding, and the blocks may be performed by elements other than those optionally described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be implemented, at least partly, as a suitably programmed computer. Likewise, the presently disclosed subject matter contemplates a computer program being readable by a computer for executing the disclosed methods. The presently disclosed subject matter further contemplates a machine-readable memory tangibly embodying a program of instructions executable by the machine for executing the disclosed methods.

The invention claimed is:

1. An animal marking control system for marking an animal comprising:
at least one transceiver communicatively coupled to a remote base station and configured to exchange data with the remote base station, the transceiver having a plurality of operation modes, each of the operation modes defining a respective frequency of communication of the transceiver with the remote base station;
a marker unit configured to selectively mark the animal; and
a processing circuitry configured to:
cause activation of the transceiver at a first operation mode of the operation modes, wherein in the first operation mode the transceiver communicates with the remote base station in a first frequency of communication;
receive an indication of a marking need from the remote base station;
upon receipt of the indication of a marking need, cause activation of the transceiver at a second operation mode of the operation modes, wherein in the second operation mode the transceiver communicates with the remote base station in a second frequency of communication;
receive marker unit activation instructions; and
upon receipt of the marker unit activation instructions, activate the marker unit.

2. The animal marking control system of claim 1, wherein the second frequency of communication is higher than the first frequency of communication.

3. The animal marking control system of claim 1, wherein a first power consumption rate of the transceiver when operating in the first operation mode is lower than a second power consumption rate of the transceiver when operating in the second operation mode.

4. The animal marking control system of claim 1, wherein the marker unit is a Light Emitting Diode capable of providing light in different colors, in accordance with a needed treatment to the animal, so that a first color of the different colors is indicative of a first needed treatment and a second color of the different colors is indicative of a second needed treatment, other than the first needed treatment.

5. The animal marking control system of claim 1, wherein the marker unit activation instructions are received from a portable device while the transceiver is operating in the second operation mode.

6. The animal marking control system of claim 1, wherein the marker unit activation instructions are received from the remote base station while the transceiver is operating in the second operation mode.

7. The animal marking control system of claim 1, wherein the processing circuitry is further configured to deactivate the marker unit upon receipt of deactivation instructions while the transceiver is operating in the second operation mode.

8. The animal marking control system of claim 6, wherein the processing circuitry is further configured to cause the transceiver to return to the first operation mode of the operation modes.

9. The animal marking control system of claim 1, wherein the marking need is determined by the remote base station in accordance with an animal state.

10. The animal marking control system of claim 9, wherein the animal state is one or more of: an estrous cycle, an illness, a potential illness or a lower welfare KPI score.

11. A method for marking an animal comprising:
    causing, by a processing circuitry, activation of a transceiver at a first operation mode of a plurality of operation modes, wherein: (a) the transceiver is communicatively coupled to a remote base station, (b) each of the operation modes defining a respective frequency of communication of the transceiver with the remote base station, and (c) in the first operation mode the transceiver communicates with the remote base station in a first frequency of communication;
    receiving, by the processing circuitry, an indication of a marking need from the remote base station;
    upon receipt of the indication of a marking need, causing, by the processing circuitry, activation of the transceiver at a second operation mode of the operation modes, wherein in the second operation mode the transceiver communicates with the remote base station in a second frequency of communication;
    receiving, by the processing circuitry, marker unit activation instructions; and
    upon receipt of the marker unit activation instructions, activating, by the processing circuitry, a marker unit configured to selectively mark the animal.

12. The method of claim 11, wherein a first power consumption rate of the transceiver when operating in the first operation mode is lower than a second power consumption rate of the transceiver when operating in the second operation mode.

13. The method of claim 11, wherein the marker unit is a Light Emitting Diode capable of providing light in different colors, in accordance with a needed treatment to the animal, so that a first color of the different colors is indicative of a first needed treatment and a second color of the different colors is indicative of a second needed treatment, other than the first needed treatment.

14. The method of claim 11, wherein the marker unit activation instructions are received from a portable device while the transceiver is operating in the second operation mode.

15. The method of claim 11, wherein the marker unit activation instructions are received from the remote base station while the transceiver is operating in the second operation mode.

16. The method of claim 11, further comprising deactivating the marker unit upon receipt of deactivation instructions while the transceiver is operating in the second operation mode.

17. The method of claim 15, further comprising causing the transceiver to return to the first operation mode of the operation modes.

18. The method of claim 11, wherein the marking need is determined by the remote base station in accordance with an animal state.

19. The method of claim 18, wherein the animal state is one or more of: an estrous cycle, an illness, a potential illness or a lower welfare KPI score.

20. A non-transitory computer readable storage medium having computer readable program code embodied therewith, the computer readable program code, executable by a processing circuitry to perform a method for marking an animal, the method comprising:
    causing, by the processing circuitry, activation of a transceiver at a first operation mode of a plurality of operation modes, wherein: (a) the transceiver is communicatively coupled to a remote base station, (b) each of the operation modes defining a respective frequency of communication of the transceiver with the remote base station, and (c) in the first operation mode the transceiver communicates with the remote base station in a first frequency of communication;
    receiving, by the processing circuitry, an indication of a marking need from the remote base station;
    upon receipt of the indication of a marking need, causing, by the processing circuitry, activation of the transceiver at a second operation mode of the operation modes, wherein in the second operation mode the transceiver communicates with the remote base station in a second frequency of communication;
    receiving, by the processing circuitry, marker unit activation instructions; and
    upon receipt of the marker unit activation instructions, activating, by the processing circuitry, a marker unit configured to selectively mark the animal.

* * * * *